US011750490B2

(12) United States Patent
Kitada et al.

(10) Patent No.: US 11,750,490 B2
(45) Date of Patent: Sep. 5, 2023

(54) COMMUNICATION COUPLING VERIFICATION METHOD, STORAGE MEDIUM, AND NETWORK VERIFICATION APPARATUS

(71) Applicant: FUJITSU LIMITED, Kawasaki (JP)

(72) Inventors: Atsushi Kitada, Kawasaki (JP); Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 17/208,896

(22) Filed: Mar. 22, 2021

(65) Prior Publication Data

US 2021/0385145 A1      Dec. 9, 2021

(30) Foreign Application Priority Data

Jun. 4, 2020 (JP) ................................. 2020-098028
Nov. 4, 2020 (JP) ................................. 2020-184725

(51) Int. Cl.
*G06F 15/16* (2006.01)
*H04L 43/10* (2022.01)
*H04L 41/14* (2022.01)

(52) U.S. Cl.
CPC ............ *H04L 43/10* (2013.01); *H04L 41/145* (2013.01)

(58) Field of Classification Search
CPC .............................. H04L 43/10; H04L 41/145
USPC ........................................................ 370/254
See application file for complete search history.

(56) References Cited

U.S. PATENT DOCUMENTS 8,976,708 B1      3/2015 Cohn et al.
11,153,228 B1 *  10/2021 Hosamani ............. H04L 41/082

2016/0036636 A1      2/2016 Erickson et al.
2019/0132216 A1 *   5/2019 Horn ....................... H04L 41/22
2019/0132250 A1     5/2019 Horn et al.
2019/0158363 A1     5/2019 Zhu et al.
2019/0245743 A1     8/2019 A et al.

FOREIGN PATENT DOCUMENTS

EP      2521312 A2     11/2012
JP    2002-185512 A     6/2002
JP    2017-524320 A     8/2017

OTHER PUBLICATIONS

Extended European Search Report dated Aug. 20, 2021 for corresponding European Patent Application No. 21161434.2, 11 pages.

* cited by examiner

*Primary Examiner* — Dustin Nguyen
*Assistant Examiner* — Joel Mesa
(74) *Attorney, Agent, or Firm* — Fujitsu Patent Center

(57) ABSTRACT

A communication coupling verification method executed by a computer, the communication coupling verification method includes identifying both setting information before a setting change of each of network devices arranged in a network and forwarding information before the setting change; identifying both setting information after the setting change and the forwarding information after the setting change; generating a first model before the setting change and a second model after the setting change by using the setting information before the setting change, the forwarding information before the setting change, the setting information after the setting change, and the forwarding information after the setting change; and determining influence of the setting change on the network based on a difference between the generated first model and the generated second model.

13 Claims, 37 Drawing Sheets

FIG. 1
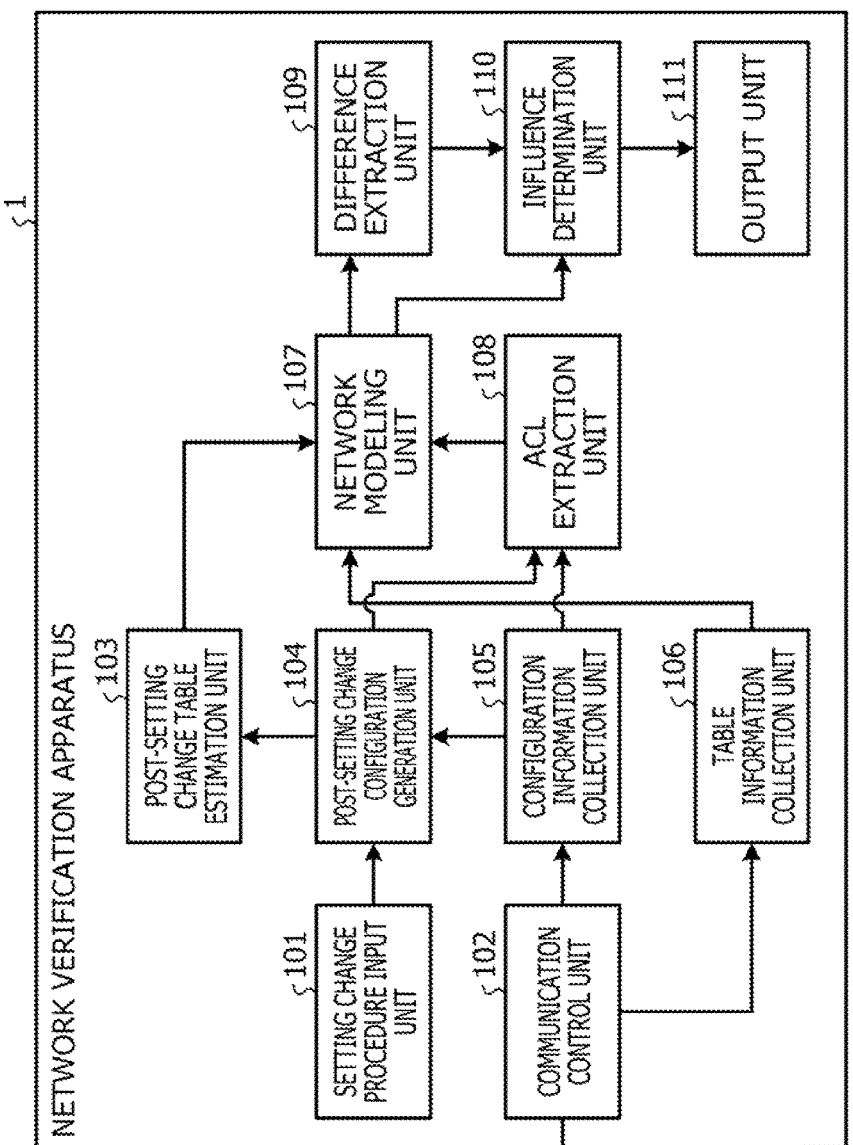
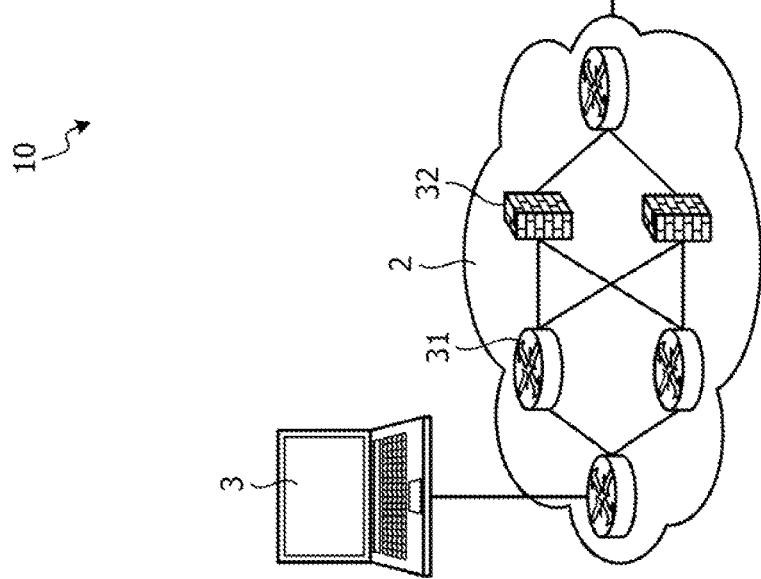

FIG. 5

| ELEMENT | SOURCE ADDRESS | DESTINATION ADDRESS |
|---|---|---|
| 221 | any | 133.28.100.0/28 |
| 222 | 202.248.10.0/24 | any |
| 223 | 202.248.10.0/24 | 133.28.100.0/28 |
| 224 | any | any |

FIG. 9

| name | src IP prefix | dest IP prefix | protocol | src port | dest port |
|---|---|---|---|---|---|
| n000 | 0.0.0.0/0 | 0.0.0.0/0 | ip | any | any |
| n001 | 0.0.0.0/0 | 192.168.1.0/30 | ip | any | any |
| n002 | 0.0.0.0/0 | 192.168.1.4/30 | ip | any | any |
| n003 | 0.0.0.0/0 | 192.168.1.8/30 | ip | any | any |
| n004 | 0.0.0.0/0 | 10.23.16.0/23 | ip | any | any |
| n005 | 0.0.0.0/0 | 10.23.32.0/24 | ip | any | any |
| n006 | 0.0.0.0/0 | 10.23.17.0/24 | ip | any | any |
| n007 | 0.0.0.0/0 | 10.23.16.0/24 | ip | any | any |
| n008 | 10.23.17.0/24 | 10.23.32.8/32 | tcp | 1024-65535 | 22 |
| n009 | 10.23.16.0/24 | 10.23.32.4/32 | tcp | 1024-65535 | 22 |
| n010 | 10.23.32.4/32 | 10.23.16.0/24 | tcp | 22 | 1024-65535 |
| n011 | 10.23.32.8/32 | 10.23.17.0/24 | tcp | 22 | 1024-65535 |
| n012 | 10.23.17.0/24 | 10.23.33.45/32 | tcp | 1024-65535 | 445 |
| n013 | 10.23.33.45/32 | 10.23.17.0/24 | tcp | 445 | 1024-65535 |
| n014 | 0.0.0.0/0 | 10.23.16.0/24 | ip | any | any |

| name | src IP prefix | dest IP prefix | protocol | src port | dest port |
|---|---|---|---|---|---|
| n000 | 0.0.0.0/0 | 0.0.0.0/0 | ip | any | any |
| n001 | 0.0.0.0/0 | 192.168.1.0/30 | ip | any | any |
| n002 | 0.0.0.0/0 | 192.168.1.4/30 | ip | any | any |
| n003 | 0.0.0.0/0 | 192.168.1.8/30 | ip | any | any |
| n004 | 0.0.0.0/0 | 10.23.16.0/23 | ip | any | any |
| n005 | 0.0.0.0/0 | 10.23.32.0/24 | ip | any | any |
| n006 | 0.0.0.0/0 | 10.23.64.0/24 | ip | any | any |
| n007 | 0.0.0.0/0 | 10.23.65.0/24 | ip | any | any |
| n008 | 10.23.17.0/24 | 10.23.32.8/32 | tcp | 1024-65535 | 22 |
| n009 | 10.23.16.0/24 | 10.23.32.4/32 | tcp | 1024-65535 | 22 |
| n010 | 10.23.32.4/32 | 10.23.16.0/24 | tcp | 22 | 1024-65535 |
| n011 | 10.23.32.8/32 | 10.23.17.0/24 | tcp | 22 | 1024-65535 |
| n012 | 10.23.17.0/24 | 10.23.16.173/32 | tcp | 1024-65535 | 445 |
| n013 | 10.23.16.173/32 | 10.23.17.0/24 | tcp | 22 | 1024-65535 |
| n014 | 0.0.0.0/0 | 10.23.16.128/25 | ip | any | any |
| n015 | 10.23.32.4/32 | 10.23.16.128/25 | tcp | 22 | 1024-65535 |

| name | src IP prefix | dest IP prefix | protocol | src port | dest port |
|---|---|---|---|---|---|
| n000 | 0.0.0.0/0 | 0.0.0.0/0 | ip | any | any |
| n001 | 0.0.0.0/0 | 192.168.1.0/30 | ip | any | any |
| n002 | 0.0.0.0/0 | 192.168.1.4/30 | ip | any | any |
| n003 | 0.0.0.0/0 | 192.168.1.8/30 | ip | any | any |
| n004 | 0.0.0.0/0 | 10.23.16.0/23 | ip | any | any |
| n005 | 0.0.0.0/0 | 10.23.32.0/24 | ip | any | any |
| n006 | 0.0.0.0/0 | 10.23.64.0/24 | ip | any | any |
| n007 | 0.0.0.0/0 | 10.23.65.0/24 | ip | any | any |
| n008 | 0.0.0.0/0 | 10.23.17.0/24 | ip | any | any |
| n009 | 0.0.0.0/0 | 10.23.16.0/24 | ip | any | any |
| n010 | 10.23.17.0/24 | 10.23.32.8/32 | tcp | 1024-65535 | 22 |
| n011 | 10.23.17.0/24 | 10.23.64.12/32 | tcp | 1024-65535 | 80 |
| n012 | 10.23.16.0/24 | 10.23.32.4/32 | tcp | 1024-65535 | 22 |
| n013 | 10.23.32.4/32 | 10.23.16.0/24 | tcp | 22 | 1024-65535 |
| n014 | 10.23.32.8/32 | 10.23.17.0/24 | tcp | 22 | 1024-65535 |
| n015 | 192.168.1.5/32 | 10.23.64.0/24 | icmp | any | any |
| n016 | 10.23.64.0/24 | 192.168.1.5/32 | icmp | any | any |
| n017 | 10.23.64.5/32 | 10.23.65.0/24 | tcp | 443 | 1024-65535 |
| n018 | 10.23.65.0/24 | 10.23.64.5/32 | tcp | 1024-65535 | 443 |

PEC#A :
{ srcIP=1.0.0.1, destIP=133.160.0.1,
  srcPort=any, dstPort=any, protocol=any}

PEC#B :
{ srcIP=1.0.0.1, destIP=192.168.0.1,
  srcPort=any, dstPort=any, protocol=any}

FIG. 31

520
"aEndPrefix": "192.168.0.1/32",
"zEndPrefix": "1.0.0.1/32",
"protocol": "ip",
"aEndPorts": "any",
"aEndPorts": "any", 521
aEnd --> zEnd --> aEnd
Reachable    aEnd --> NAT --> zEnd --> aEnd
zEnd --> aEnd --> zEnd
UnReachable    aEnd --> NAT --> NAT(blackhole)

522
aEnd --> zEnd
Reachable    aEnd --> NAT --> zEnd
zEnd --> aEnd
UnReachable    zEnd --> NAT --> NAT(blackhole)

FIG. 34
541
```
"aEndPrefixx": "192.168.0.1/32",
"zEndPrefixx": "1.0.0.1/32",
"protocol": "ip",
"aEndPorts": "any",
"aEndPorts": "any",
```
542
```
aEnd --> zEnd --> aEnd
Reachable    aEnd --> FW --> zEnd --> FW --> aEnd
zEnd --> aEnd --> zEnd
UnReachable  zEnd --> FW(blocked)
```
543
```
aEnd --> zEnd
Reachable    aEnd --> FW --> zEnd
zEnd --> aEnd
UnReachable  zEnd --> FW(blocked)
```

COMMUNICATION COUPLING VERIFICATION METHOD, STORAGE MEDIUM, AND NETWORK VERIFICATION APPARATUS

CROSS-REFERENCE TO RELATED APPLICATION

This application is based upon and claims the benefit of priority of the prior Japanese Patent Application Nos. 2020-184725, filed on Nov. 4, 2020, and 2020-98028, filed on Jun. 4, 2020, the entire contents of which are incorporated herein by reference.

FIELD

The embodiments discussed herein are related to a communication coupling verification method, a storage medium, and a network verification apparatus.

BACKGROUND

In recent years, digital businesses in which various businesses produce new values in combination with digital technologies have been spreading. In the digital businesses, a measure spreading as measures for gaining advantages over competitors by shortening their business cycles is a microservice architecture which establishes a digital business system by combining small functions called microservices together.

In the microservice architecture, an Internet Protocol (IP) network is used for communications between microservices. The importance of the IP network has been increasing more and more because the IP network is used for various communications including communications between microservices as described above. A failure of the IP network causes many failures in communications between microservices, and therefore influences various digital services. For this reason, for a change in the settings of network devices constituting an existing IP network for the purpose of, for example, adding a new communication to the IP network, it is desirable to fully verify whether or not the change in the settings influences the existing communications.

In many existing IP networks, for changing the settings of network devices, a network expert creates a setting change procedure based on a setting change request called an intent, setting information of the existing network, a list of important existing communications, and so forth. The created setting change procedure is checked by another network expert. This makes the setting change less likely to influence the existing communications.

After a setting change, some important communications are manually checked by using a method such as ping or traceroute to investigate whether the existing communications are influenced by the setting change. If it is found that any of the existing communications is influenced by the setting change, a network expert takes countermeasures to get rid of the influence of the setting change on the existing communication.

As a technique of verifying coupling in a network, there is a technique in the related art in which a virtual network is created on a verification server, and whether communications between systems are possible before and after a change is checked by a route search. There is another technique in the related art in which states of an existing network are acquired and modeled, and the states are analyzed based on topology differences before and after a change to check the connectivity. For example, Japanese Laid-open Patent Publication No. 2002-185512, Japanese National Publication of International Patent Application No. 2017-524320, and so forth are disclosed as the related art.

SUMMARY

According to an aspect of the embodiments, a communication coupling verification method executed by a computer, the communication coupling verification method incudes identifying both setting information before a setting change of each of network devices arranged in a network and forwarding information before the setting change; identifying both setting information after the setting change and the forwarding information after the setting change; generating a first model before the setting change and a second model after the setting change by using the setting information before the setting change, the forwarding information before the setting change, the setting information after the setting change, and the forwarding information after the setting change; and determining influence of the setting change on the network based on a difference between the generated first model and the generated second model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a network verification apparatus;

FIG. 5 is a diagram of a list of elements in a meetsemilattice generated for a sample network;

FIG. 9 is a diagram illustrating elements in a meetsemilattice generated from the first network;

FIG. 10 is a diagram illustrating PECs in the first network;

FIG. 14 is a diagram illustrating elements in a meetsemilattice generated from the second network;

FIG. 15 is a diagram illustrating PECs in the second network;

FIG. 19 is a diagram illustrating elements in a meetsemi-lattice generated from the third network;

FIG. 20 is a diagram illustrating PECs in the third network;

FIG. 30 is a diagram illustrating an example of PECs before and after passing through the address conversion device;

FIG. 31 is a diagram for explaining determination on reachability of communication requests in the cases of a round-trip communication and a one-way communication using NAT;

FIG. 34 is a diagram for explaining determination of reachability of communication requests in the case of a round-trip communication and a one-way communication using the firewall SPI;

DESCRIPTION OF EMBODIMENTS

Figure 2:
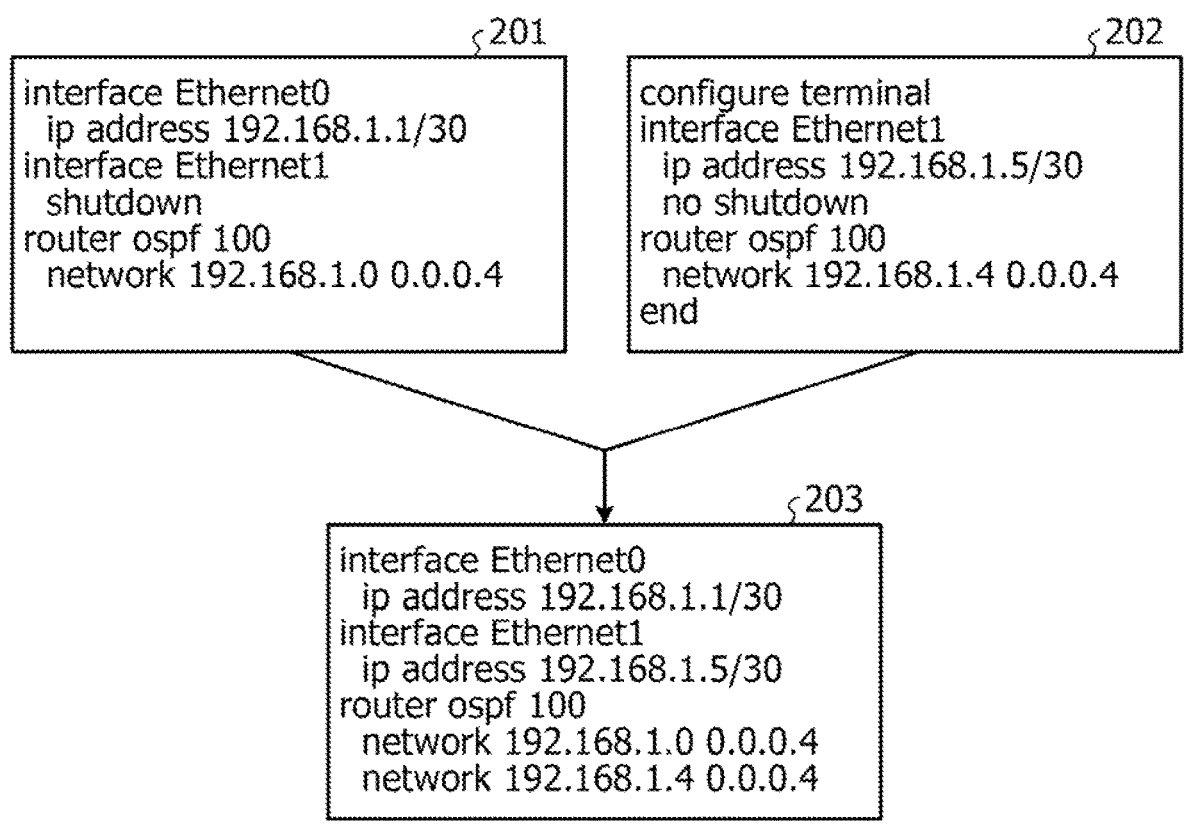
FIG. 2 is a diagram illustrating an example of generation of setting information of network devices after a setting change.

In the method of checking influence on existing communications in the rerated art, the existing communications are manually checked one by one after the setting change to investigate whether the communications are influenced. Such influence checking requests a considerable time. In addition, such an individual influence check on each of the existing communications increases the time for the check in proportion to the number of existing communications, and makes it difficult to perform overall check on a large-scale IP network including a huge number of existing communications. For this reason, in many IP networks, the influence check on only some important communications is conducted instead of the influence check on all the existing communications.

Even assuming that the time for the check does not matter, a list of existing communications to be checked is inevitably used for more overall influence check on the existing communications. However, in many IP networks, a complete list of existing communications is not managed. For this reason, in the existing network, the influence check on only some important communications is also conducted instead of the influence check on all the existing communications. However, in some cases, the influence check on only some important communications is not sufficient as the overall check of the influence of the setting change on the existing communications.

With the above circumstances taken into consideration, it is desirable to perform overall and efficient network verification.

Hereinafter, embodiments of a communication coupling verification method, a communication coupling verification program, and a network verification apparatus disclosed in the present application will be described in detail with reference to the drawings. The communication coupling verification method, the communication coupling verification program, and the network verification apparatus disclosed in the present application are not limited to the following embodiments.

Embodiment 1

FIG. 1 is a block diagram of a network verification apparatus. A network verification system 10 includes a network verification apparatus 1, a network 2 to be verified, and an administrator terminal 3.

The network verification apparatus 1 is coupled to the network 2. The administrator terminal 3 is coupled to the network 2 and communicates with the network verification apparatus 1 via the network 2.

The network 2 includes network devices such as routers 31 and firewalls 32. Each of the routers 31 has a forwarding table for forwarding signals. Each of the firewalls 32 is implemented by, for example, a switch. A filtering rule for determining whether to allow a signal to pass is set in the firewall 32. The routers 31 and the firewalls 32 will be collectively referred to as the network devices below in some cases.

An administrator of the network 2 uses the administrator terminal 3 to set setting information and the forwarding tables for performing communications in the network devices such as the routers 31 and the firewalls 32 in the network 2.

The network verification apparatus 1 verifies the network 2. Hereinafter, details of the network verification apparatus 1 will be described. As illustrated in FIG. 1, the network verification apparatus 1 includes a setting change procedure input unit 101, a communication control unit 102, a post-setting change table estimation unit 103, a post-setting change configuration generation unit 104, a configuration information collection unit 105, and a table information collection unit 106. The network verification apparatus 1 further includes a network modeling unit 107, an access control list (ACL) extraction unit 108, a difference extraction unit 109, an influence determination unit 110, and an output unit 111.

The administrator of the network 2 uses the setting change procedure input unit 101 to input a setting change procedure for the network devices included in the network 2 to be verified. The setting change procedure input unit 101 outputs the setting change procedure input by the administrator to the post-setting change configuration generation unit 104.

The communication control unit 102 is a communication interface that controls communications between the network verification apparatus 1 and the network 2. The units in the network verification apparatus 1 communicate with the various network devices included in the network 2 via the communication control unit 102. As described above, the units in the network verification apparatus 1 communicate with the network devices included in the network 2 actually via the communication control unit 102, but the following description will be provided in some cases while omitting this relay operation of the communication control unit 102.

The configuration information collection unit 105 collects the setting information from all the network devices in the network 2 via the communication control unit 102. The configuration information collection unit 105 outputs the collected setting information to the post-setting change configuration generation unit 104 and the ACL extraction unit 108.

The table information collection unit 106 collects forwarding information from all the network devices in the network 2 via the communication control unit 102. The table information collection unit 106 outputs the collected forwarding information of all the network devices to the network modeling unit 107.

The post-setting change configuration generation unit 104 receives the input of the setting change procedure from the setting change procedure input unit 101. The post-setting change configuration generation unit 104 receives the input of the setting information before the setting change from the configuration information collection unit 105. The post-setting change configuration generation unit 104 generates setting information of each of the network devices after the setting change from the setting information before the setting change by using the setting change procedure. Thereafter, the post-setting change configuration generation unit 104 outputs the generated setting information of each of the network devices after the setting change to the post-setting change table estimation unit 103 and the ACL extraction unit 108.

FIG. 2 is a diagram illustrating an example of generation of setting information of network devices after a setting change. The post-setting change configuration generation unit 104 acquires, for example, setting information 201 of the network devices before the setting change. The post-setting change configuration generation unit 104 acquires a setting change procedure 202 for the network devices. The post-setting change configuration generation unit 104 changes the settings for Ethernet (registered trademark) in the setting information 201 to the settings specified in the setting change procedure 202 to enable Ethernet1 to be used. The post-setting change configuration generation unit 104 changes the settings for the router in the setting information 201 to the settings specified in the setting change procedure 202. In this manner, the post-setting change configuration generation unit 104 generates setting information 203 of each of the network devices after the setting change.

Returning to FIG. 1, the description will be continued. The post-setting change table estimation unit 103 receives the input of the setting information of each of the network devices after the setting change from the post-setting change configuration generation unit 104. The post-setting change table estimation unit 103 estimates contents in the forwarding table of each of the network devices after the setting change by simulation from the setting information of the concerned network device after the setting change. For example, the post-setting change table estimation unit 103 estimates the contents in the forwarding table of each of the network devices after the setting change using a technique such as GNS3 (https://www.gns3.com/) or Batfish (https://www.batfish.org). After that, the post-setting change table estimation unit 103 outputs the estimated forwarding information of each of the network devices in the network 2 after the setting change to the network modeling unit 107.

The ACL extraction unit 108 receives the input of the setting information of each of the network devices before the setting change from the configuration information collection unit 105. The ACL extraction unit 108 receives the input of the setting information of each of the network devices after the setting change from the post-setting change configuration generation unit 104. The ACL extraction unit 108 extracts the ACLs that are filtering information specifying filtering rules set before and after the setting change in each of the network devices. The ACL extraction unit 108 outputs the extracted ACLs before and after the setting change in each of the network devices to the network modeling unit 107.

The network modeling unit 107 receives the input of the forwarding information before the setting change in each of the network devices in the network 2 from the table information collection unit 106. The network modeling unit 107 receives the input of the ACLs before and after the setting change in each of the network devices in the network 2 from the ACL extraction unit 108. The network modeling unit 107 generates a data plane model of the network 2 before the setting change by using the forwarding information before the setting change and the filtering information included in the ACLS before the setting change in all the network devices in the network 2.

The network modeling unit 107 receives the input of the forwarding information after the setting change in each of the network devices in the network 2 from the post-setting change table estimation unit 103. The network modeling unit 107 generates a data plane model of the network 2 after the setting change by using the forwarding information after the setting change and the filtering information included in the ACLS after the setting change in all the network devices in the network 2.

Hereinafter, the generation of the data plane models of the network 2 before and after the setting change by the network modeling unit 107 will be described in detail. The network modeling unit 107 extracts flows from the forwarding information and the filtering information of the network devices in the network 2. A flow is a set of packets that behave in the same manner in the network 2. The flow will be also referred to as a packet equivalence class (PEC) below in some cases. For example, the network modeling unit 107 extracts the flows in the following method.

Figure 3:
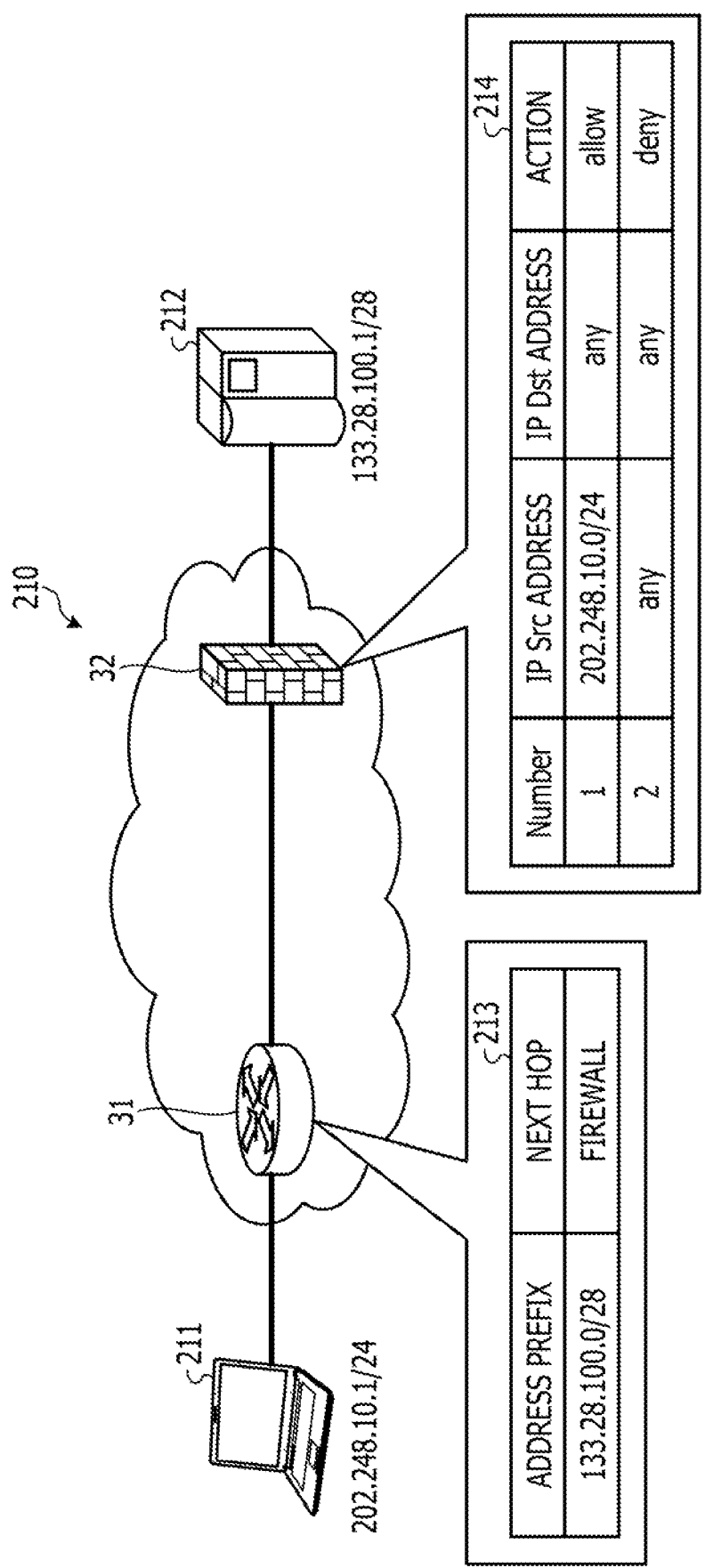
FIG. 3 is a diagram for explaining flow extraction and data plane model generation.

FIG. 3 is a diagram for explaining flow extraction and data plane model generation. In a sample network 210 illustrated in FIG. 3, there is a network between a terminal 211 and a server 212, and this network includes a router 31 and a firewall 32. In this case, the terminal 211 is coupled to the router 31, the router 31 is coupled to the firewall 32, and the firewall 32 is coupled to the server 212. The router 31 has a forwarding table 213 illustrated in FIG. 3 as the forwarding information. The setting information in the firewall 32 includes a filtering rule 214 illustrated in FIG. 3. The description will be given of a case where packet reachability from the terminal 211 to the server 212 is checked in the sample network 210.

The network modeling unit 107 constructs a meetsemilattice (meetsemilattice) in which sets of packet headers conforming to each of the forwarding information and the filtering information of all the network devices in the network 2 are included as elements. The meetsemilattice is a partially ordered set, in which when two elements in a specific meetsemilattice have an intersection, the intersection is also an element in the specific meetsemilattice.

The network modeling unit 107 constructs the meetsemilattice including all the forwarding information and the filtering information included in the sample network 210 in FIG. 3. The forwarding table 213 of the router 31 in FIG. 3 has one entry. This entry indicates that an IP packet in which the destination address is an address in a range of 133.28.100.0/28 is to be forwarded by the router 31.

Figure 4:
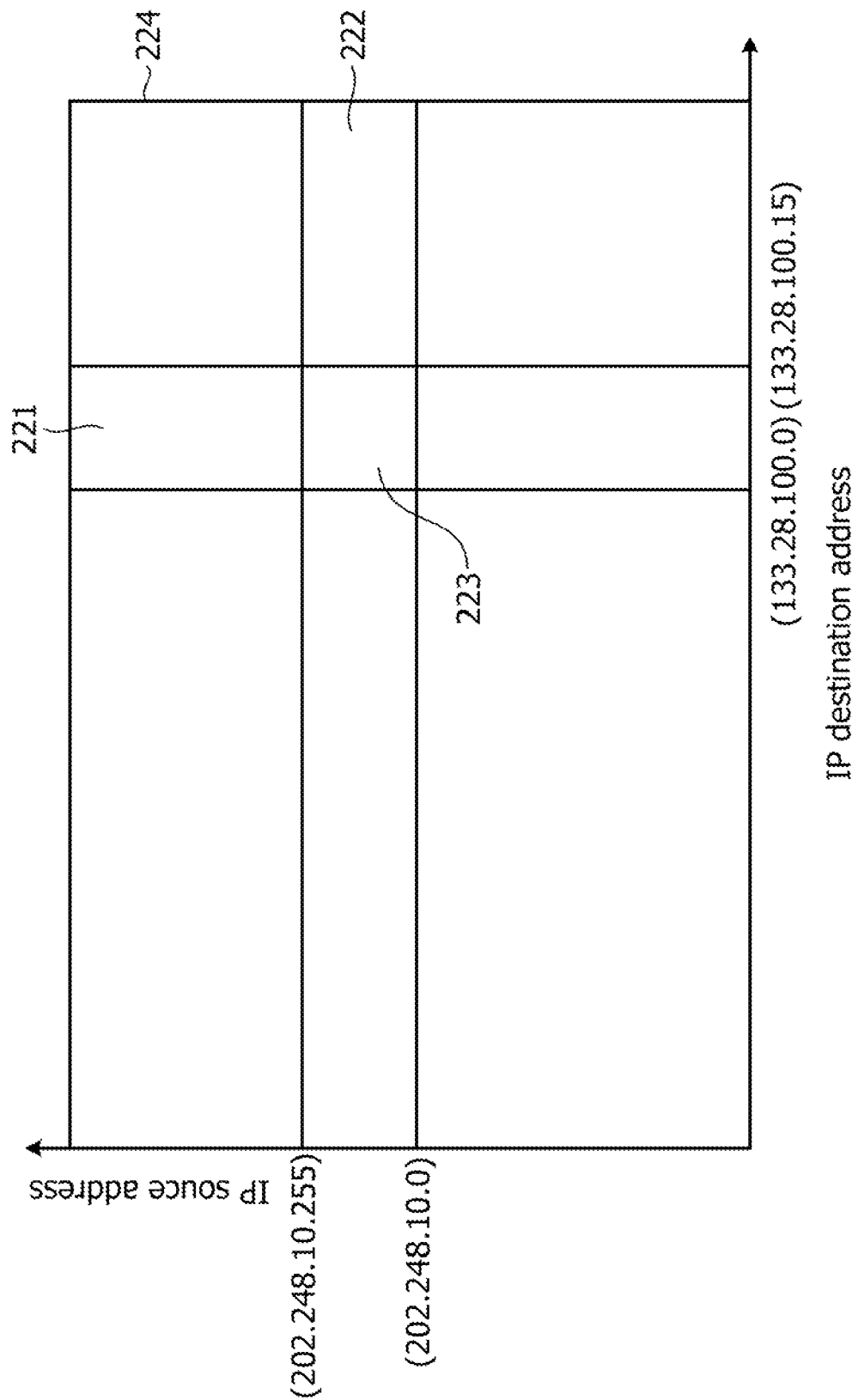
FIG. 4 is a diagram for explaining an example of a meetsemilattice.

Therefore, as illustrated in FIG. 4, the network modeling unit 107 adds a set of packets in each of which the destination address is an address in the range of 133.28.100.0/28 as an element 221 in the meetsemilattice discussed herein. FIG. 4 is a diagram for explaining an example of a meetsemilattice. In FIG. 4, the vertical axis represents a source address and the horizontal axis represents a destination address.

Two rules are set as the filtering rule 214 of the firewall 32 in FIG. 3. One of the rules specifies that a packet in which the source address is an address in a range of 202.248.10.0/24 is allowed to pass through the firewall 32.

Therefore, as illustrated in FIG. 4, the network modeling unit 107 adds a set of packets in each of which the source address is an address in the range of 202.248.10.0/24 as an element 222 in the meetsemilattice discussed herein. The network modeling unit 107 also adds an element 223, which is an intersection of the element 221 and the element 222, as an element in the meetsemilattice according to the nature of the meetsemilattice.

The network modeling unit 107 also adds the other rule of the filtering rule 214 in FIG. 3 to the meetsemilattice as an element 224 illustrated in FIG. 4. The element 224 covers all packets each having any destination address and any source address. The element 224 has intersections with the respective elements 221 to 223, and the intersections are exactly the same as the elements 221 to 223 and are already added as the elements in the meetsemilattice discussed herein. Therefore, the network modeling unit 107 does not newly add the sets of the intersections of the element 224 with the elements 221 to 223 as elements in the meetsemilattice.

FIG. 5 is a diagram of a list of elements in a meetsemilattice generated for a sample network. The element 221 in FIG. 5 is an element for the entry in the forwarding table 213 in FIG. 3. The element 222 is an element for one of the rules in the filtering rule 214 of the firewall 32 in FIG. 3. The element 223 is an element for the intersection of the element 221 and the element 222. The element 224 is an element for the other rule in the filtering rule 214 of the firewall 32 in FIG. 3.

Figure 6:
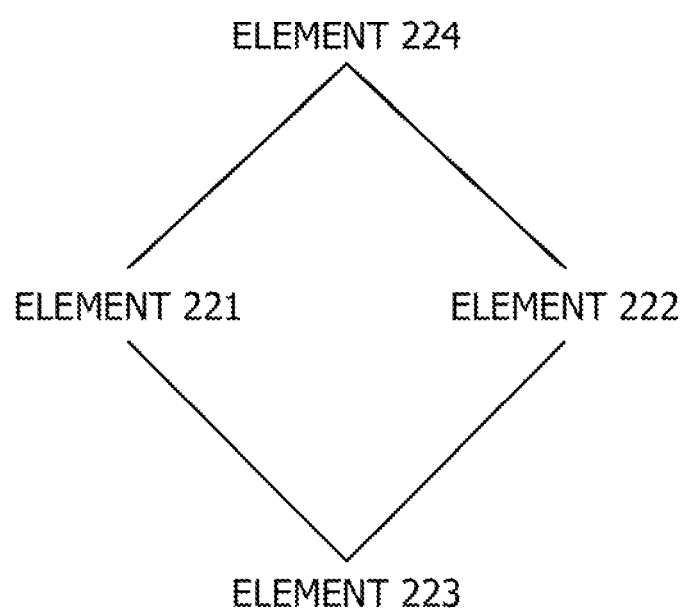
FIG. 6 is a diagram illustrating an example of a Hasse diagram.

Hereinafter, a parent-child relationship among elements in the meetsemilattice will be described. In a case where an element α and an element β have a relationship of $\alpha \subset \beta$ and where γ satisfying $\alpha \subset \gamma \subset \beta$ is not contained in the meetsemilattice, a parent-child relationship is established between a and 13 and a is referred to as a child of β. A Hasse diagram is a diagram simply illustrating this parent-child relationship. In the Hasse diagram, a parent element is depicted above a child element and the parent and child elements are linked by a line. FIG. 6 illustrates a Hasse diagram for the elements 221 to 224 in the meetsemilattice illustrated in FIG. 5. FIG. 6 is a diagram illustrating an example of a Hasse diagram.

The network modeling unit 107 obtains PECs in the sample network 210 in FIG. 3 based on the Hasse diagram illustrated in FIG. 6. For example, the network modeling unit 107 obtains a PEC by subtracting a sum of child elements of a certain parent element from the certain parent element in the meetsemilattice. When a certain element has no child element, the network modeling unit 107 just sets the certain element as the PEC.

For example, provided that #A denotes the PEC in the case of focusing on the element 221 in the meetsemilattice, the network modeling unit 107 calculates the PEC as #A=the element 221—the element 223. Similarly, when the network modeling unit 107 calculates the PECs in the case of focusing on all the other elements in the meetsemilattice, the network modeling unit 107 calculates the PECs as #B=the element 222—the element 223, #C=the element 223, and #D=the element 224—(the element 221 ∪ the element 222).

As a result of obtaining the PECs in this manner, for example, packets contained in the element 221 in the meetsemilattice but not contained in the element 222 in the meetsemilattice are contained in the PEC #A. The packets having packet headers contained in the PEC #A may be said to behave in the same manner in the sample network 210 in FIG. 3. Similarly, all packets having packet headers included in each of the PECs #B to #D behave in the same manner.

Figure 7:
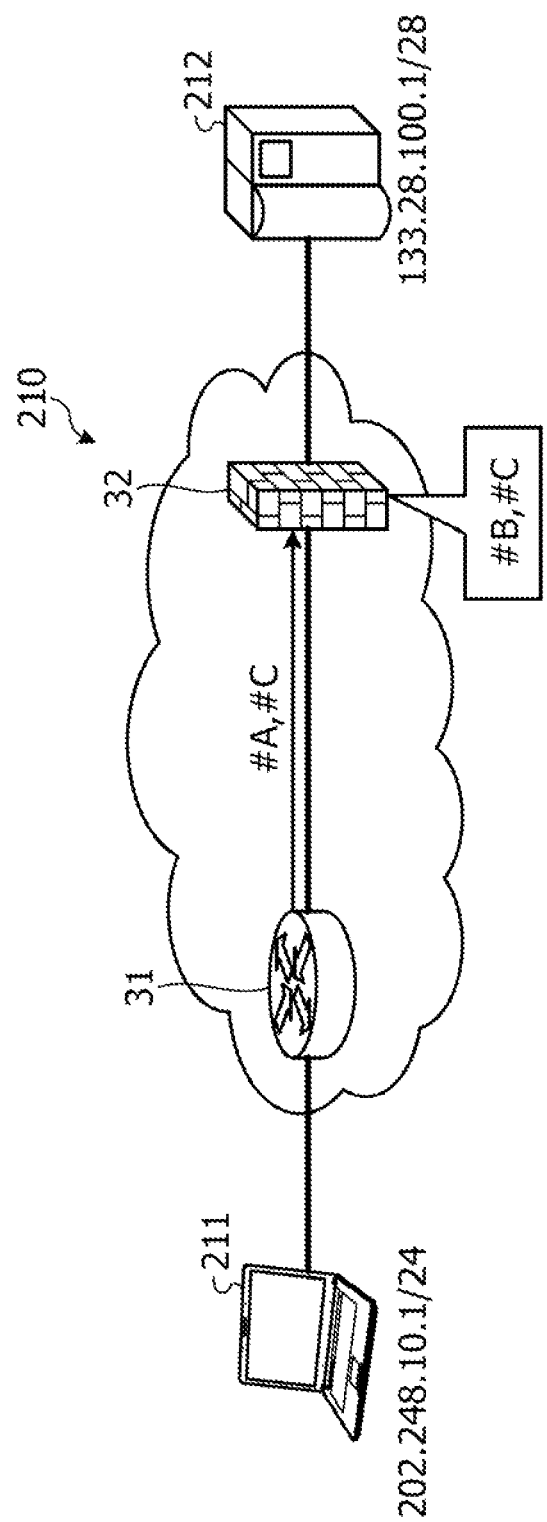
FIG. 7 is a diagram illustrating a result of labeling a sample network with PECs.

Next, the network modeling unit 107 labels a topology graph representing the network 2 with the PECs calculated in the above procedure. First, the forwarding table 213 of the router 31 in FIG. 3 includes an entry for forwarding packets each having a destination address within 133.28.100.0/28 to the firewall 32. The network modeling unit 107 labels an arrow directed from the router 31 to the firewall 32 with the PECs included in the element 221, which is the element in the meetsemilattice associated with this entry, as illustrated in FIG. 7. FIG. 7 is a diagram illustrating a result of labeling a sample network with PECs. Here, the network modeling unit 107 uses the names of the PECs as labels.

Next, the filtering rule 214 of the firewall 32 in FIG. 3 includes an entry for allowing packets each having a source address within 202.248.10.0/24 to pass through. The network modeling unit 107 labels the firewall 32 with all the PECs included in the element 222 in the meetsemilattice associated with this entry. The network modeling unit 107 performs the following process for labeling the firewall 32. For example, the network modeling unit 107 does not label the firewall 32 with a PEC conforming to a filtering rule for blocking a packet, such as a rule in which the action is "deny". In this way, the network modeling unit 107 labels the sample network 210 as illustrated in FIG. 7.

In FIG. 3, the filtering conditions including the source address and the destination address are presented as the filtering rule 214 for the sake of simplicity. Instead, a filtering rule may be set which also includes Information such as a protocol type of an upper layer of the IP and a port number. The filtering rule 214 is assumed to be applied to all traffic to pass through the firewall 32 in FIG. 3. Alternatively, the filtering rule may be set to be applied to traffic in a specific direction at a specific interface.

The network modeling unit 107 labels the network topology by using the PECs extracted from the network as described above, and thereby models the data plane of the network 2 to generate the data plane model of the network 2. Use of such a data plane model makes it easy to understand the number of flows that behave differently in the network 2 and how each flow behaves in each network device in the network 2. Returning to FIG. 1, the description will be continued. The network modeling unit 107 outputs the generated data plane model of the network 2 before the setting change and the generated data plane model of the network 2 after the setting change to the difference extraction unit 109 and the influence determination unit 110.

The difference extraction unit 109 receives the input of the data plane model of the network 2 before the setting change and the data plane model of the network 2 after the setting change from the network modeling unit 107. The difference extraction unit 109 obtains differences between the data plane model of the network 2 before the setting change and the data plane model of the network 2 after the setting change. For example, the difference extraction unit 109 compares the data plane models before and after the setting change and performs difference extraction by removing duplicate flows. The difference extraction unit 109 identifies added flows and deleted flows to obtain the differences before and after the setting change. Next, the difference extraction unit 109 extracts flows influenced by the setting change by using the obtained differences before and after the setting change. After that, the difference extraction unit 109 outputs information on the extracted flows to the influence determination unit 110.

The influence determination unit 110 receives the input of the data plane model of the network 2 before the setting change and the data plane model of the network 2 after the setting change from the network modeling unit 107. The influence determination unit 110 receives the input of the information on the flows influenced by the setting change from the difference extraction unit 109.

Next, using the data plane models of the network 2 before and after the setting change, the influence determination unit 110 extracts each flow that may include an existing communication that is a communication existing in the network 2 before the setting change from among the flows influenced by the setting change. The flows extracted here are some of the flows influenced by the setting change, but the flows extracted here will be referred to as the flows influenced by the setting change below. The influence determination unit 110 makes the determination concerning the influence of each flow influenced by the setting change on the existing communications. Details of the flow extraction process by the influence determination unit 110 will be described below.

The influence determination unit 110 extracts one flow from the flows influenced by the setting change. Hereinafter, the extracted flow will be referred to as a "determination target flow".

The influence determination unit 110 traces the determination target flow from the difference-detected network device in the data plane model before the setting change, and identifies the reached point of the determination target flow. The influence determination unit 110 determines whether or not the determination target flow is forwarded to the outside of the modeling range of the network 2 in the data plane model before the setting change.

If the flow is not forward to the outside of the modeling range of the network 2, the influence determination unit 110 determines whether the reached point of the determination target flow includes the destination of the determination target flow. If the reached point of the determination target flow does not include the destination of the determination target flow, the influence determination unit 110 determines that the determination target flow is not used in any of the communications in the network 2 before the setting change. Thus, the influence determination unit 110 determines that the determination target flow does not influence the existing communications.

On the other hand, if the reached point of the determination target flow includes the destination of the determination target flow, the influence determination unit 110 traces the determination target flow from the difference-detected network device in the data plane model after the setting change and identifies the reached point of the determination target flow. The influence determination unit 110 determines whether the reached points of the determination target flow are the same in the data plane models before and after the setting change.

If the reached points of the determination target flow are the same in the data plane models before and after the setting change, the influence determination unit 110 determines that the determination target flow does not influence the existing communications. Meanwhile, if the reached points of the determination target flow are not the same in the data plane models before and after the setting change, the influence determination unit 110 determines that the determination target flow influences the existing communications.

On the other hand, if the determination target flow is forwarded to the outside of the modeling range of the network 2, the influence determination unit 110 traces the determination target flow from the difference-detected network device in the data plane model after the setting change, and identifies the reached point of the determination target flow. The influence determination unit 110 determines whether the network device serving as the exit to the outside of the range of the data plane model after the setting change is the same as that in the data plane model before the setting change and whether the network device transmits the determination target flow to the same next hop address.

If the network device as the exit and the next hop address for the determination target flow remain the same before and after the setting change, the behaviors of the determination target flow before and after the setting change are considered to be the same. Thus, the influence determination unit 110 determines that the determination target flow does not influence the existing communications.

On the other hand, if the network device as the exit or the next hop address for the determination target flow differs, the behaviors of the determination target flow before and after the setting change are considered to be different. In this case, the influence determination unit 110 determines whether or not there is a network device having an ACL entry allowing a passage of the determination target flow in the data plane model before the setting change.

If there is the network device having the ACL entry allowing the passage of the determination target flow, it may be said that filtering that directly influences the determination target flow is performed before the setting change. Thus, the influence determination unit 110 determines that the determination target flow has a high possibility of influencing the existing communications.

On the other hand, if there is no network device having an ACL entry allowing a passage of the determination target flow, it may be said that direct filtering of the determination target flow is not performed before the setting change. However, it is difficult to determine whether the destination address of the determination target flow is appropriately set outside the range of the network 2. Thus, the influence determination unit 110 determines that it is desirable to check whether or not the destination address of the determination target flow is appropriately set outside the range of the network 2.

The influence determination unit 110 performs the above-described determination concerning the influence of the determination target flow on the existing communications for all the flows influenced by the setting change. The influence determination unit 110 outputs the determination results for all the flows influenced by the setting change to the output unit 111.

The output unit 111 receives, from the influence determination unit 110, the input of the determination result concerning the influence of each of the flows influenced by the setting change on the existing communications. The output unit 111 notifies the administrator of the network 2 of the determination result of the influence of each of the flows influenced by the setting change on the existing communications. The output unit 111 may notify the administrator of the network 2 of the information on all the flows influenced by the setting change, or may notify the administrator of the information on only flows each determined to have a possibility of influencing the existing communications among all the influenced flows.

Figure 8:
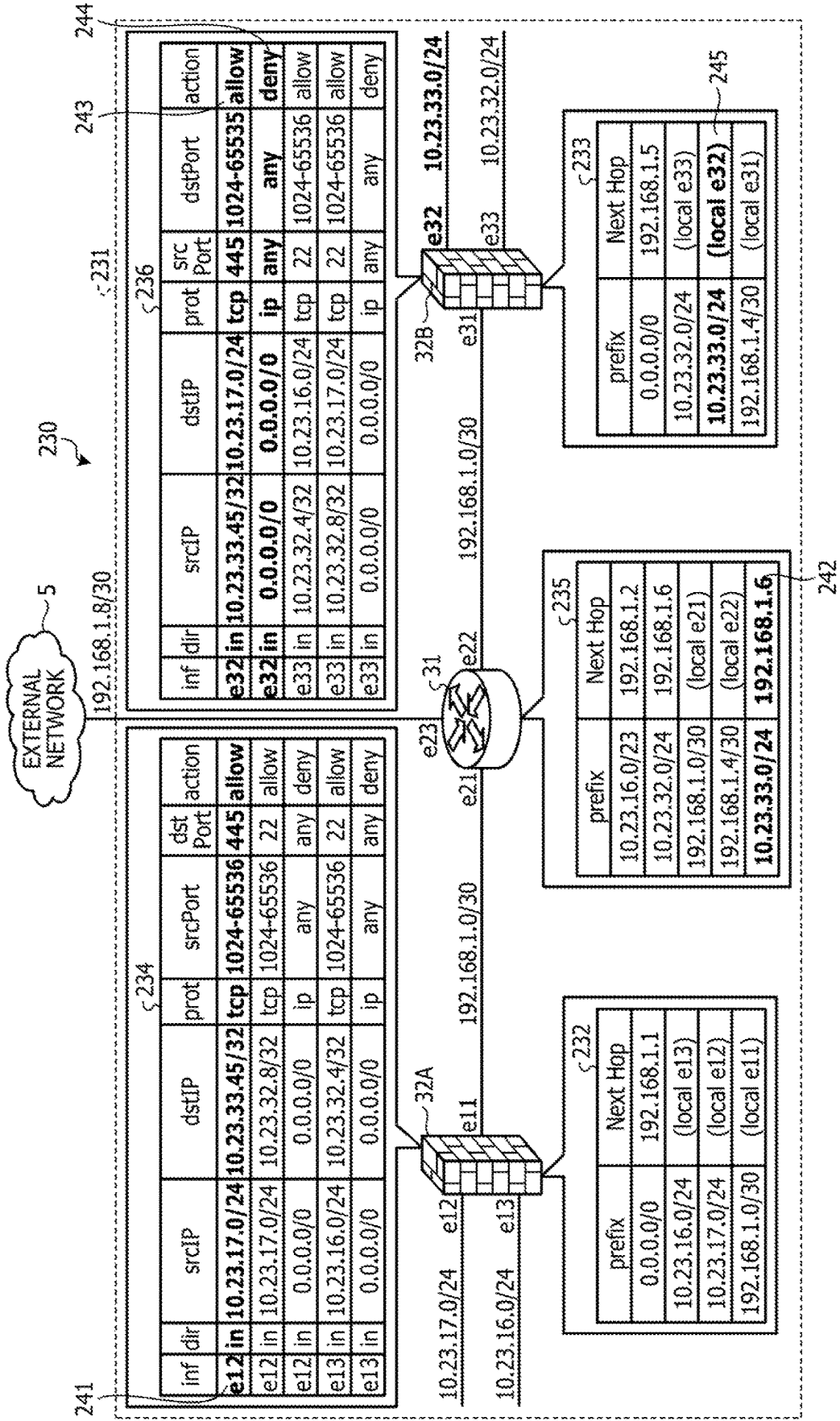
FIG. 8 is a diagram illustrating a first network for explaining a verification procedure.

Next, the verification procedure will be described in more detail by using a specific example. FIG. 8 is a diagram illustrating a first network for explaining the verification procedure. A network 230 illustrated in FIG. 8 includes a router 31 and firewalls 32A and 32B. The router 31 is coupled to an external network 5. A range 231 is a modeling range for creating a data plane model of the network 230.

A forwarding table 235 is set in the router 31. A forwarding table 232 and a filtering rule 234 are set in the firewall 32A. A forwarding table 233 and a filtering rule 236 are set in the firewall 32B. In addition, e11 to e33 depicted beside the router 31 and the firewalls 32A and 32B represent their own network interfaces. In the network 230, interfaces and directions for which filtering rules are not set allow all packets to pass through.

A case where the following setting change request is made for the network 230 will be described. For example, a communication is newly opened between a port in a range of TCP ports 1024 to 65535 of a certain host in a subnet coupled to the interface e12 of the firewall 32A and a TCP port 445 of a newly-installed server coupled to a subnet newly set in the interface e32 of the firewall 32B.

For this setting change request, the following setting change procedure is created. For example, a subnet having addresses 10.23.33.0/24 is allocated to the interface e32 of the firewall 32B. An IP address 10.34.33.45 is allocated to the newly-installed server. The post-setting change configuration generation unit 104 receives the input of this setting change procedure from the setting change procedure input unit 101.

The post-setting change configuration generation unit 104 generates the setting information after the setting change from the acquired setting change procedure and the setting information before the setting change of the router 31 and the firewalls 32A and 32B collected by the configuration information collection unit 105. From the setting information after the setting change, the post-setting change table estimation unit 103 generates the forwarding table 235 to which an entry 242 is added and the forwarding table 233 to which an entry 245 is added in FIG. 8. The ACL extraction unit 108 extracts the filtering information before and after the setting change from the setting information of the router 31 and the firewalls 32A and 32B before and after the setting change. The ACL extraction unit 108 adds entries 243 and 244 as the filtering information after the setting change.

Figure 10:
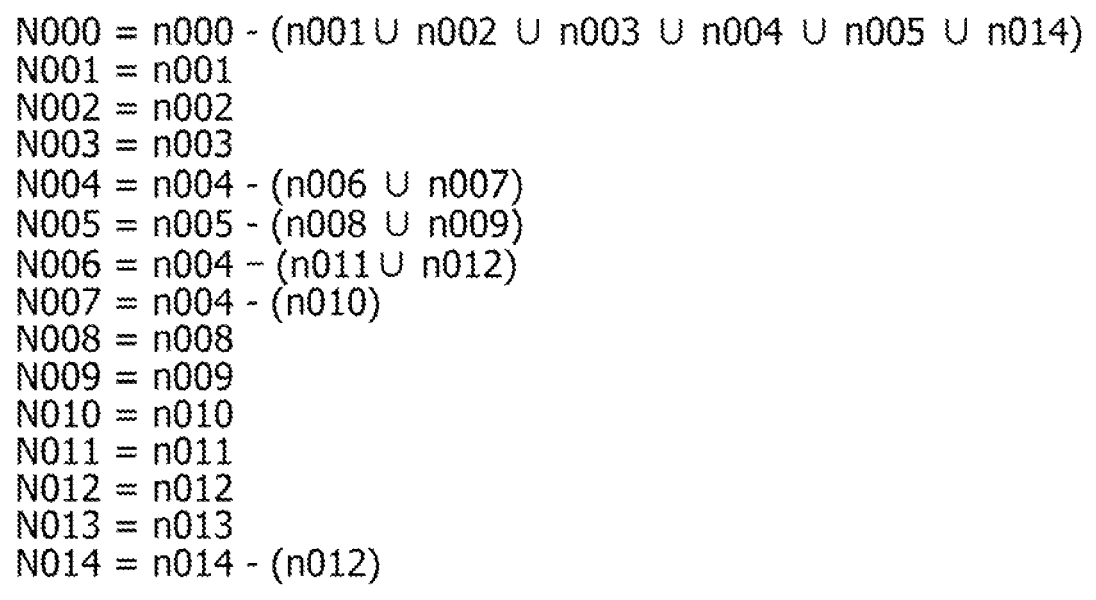
Figure 11:
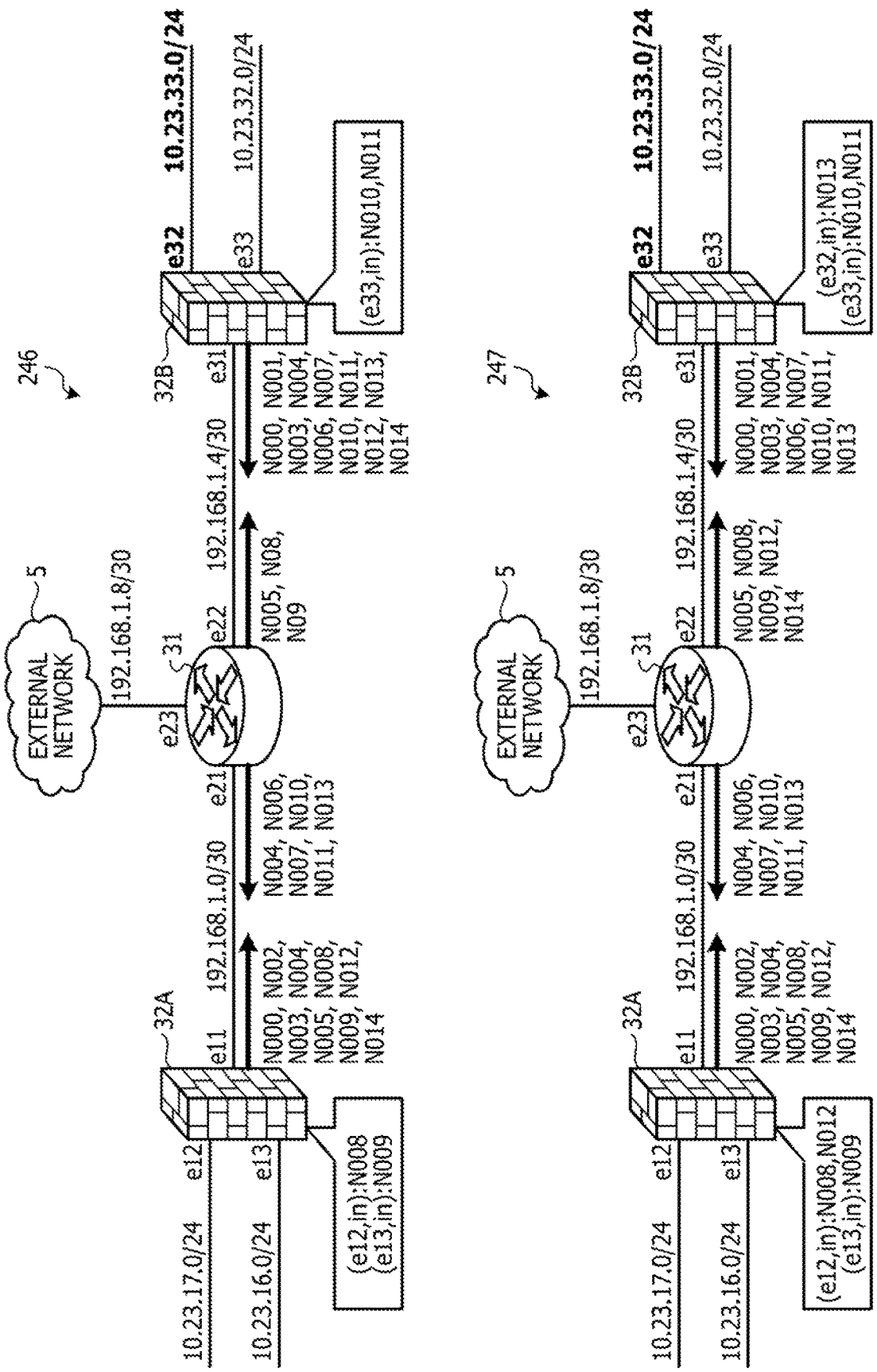
FIG. 11 is a diagram illustrating data plane models generated from the first network.

The network modeling unit 107 generates a meetsemilattice having elements illustrated in FIG. 9 from the information before and after the setting change in the forwarding tables 232, 233, and 235 and the information before and after the setting change in the filtering rules 234 and 236 illustrated in FIG. 8. FIG. 9 is a diagram illustrating elements in a meetsemilattice generated from the first network. Each of elements n000 to n014 in FIG. 9 includes an element satisfying the conditions of respective items as indicated in the corresponding row. Next, the network modeling unit 107 generates PECs illustrated in FIG. 10 from the generated meetsemilattice. FIG. 10 is a diagram illustrating the PECs in the first network. The network modeling unit 107 generates the PECs representing flows N000 to N014 illustrated in FIG. 10. The network modeling unit 107 generates a data plane model 246 before the setting change and a data plane model 247 after the setting change of the network 230 illustrated in FIG. 11 by using the generated PECs. FIG. 11 is a diagram illustrating the data plane models generated from the first network.

Figure 12:
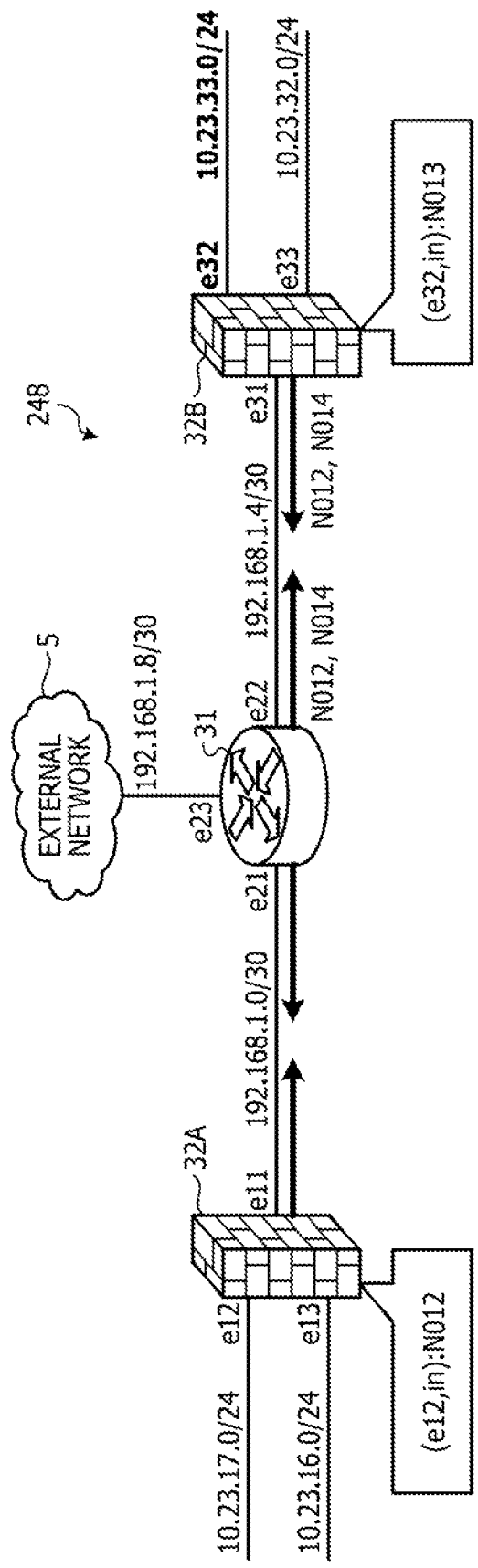
FIG. 12 is a diagram illustrating differences before and after a setting change in the first network.

As illustrated in FIG. 12, the difference extraction unit 109 extracts differences 248 between the data plane model 246 and the data plane model 247. FIG. 12 is a diagram illustrating the differences before and after the setting change in the first network. As indicated in the differences 248, the flows N012 and N014 are changed in the router 31 due to this setting change. The flows N012, N013, and N014 are changed in the firewall 32B. The flow N012 is changed in the firewall 32A. The flows other than the above flows are unchanged before and after the setting change. Thus, even if these unchanged flows are used in the existing communications, the communications may be considered to receive no influence of the setting change. For this reason, the influence determination unit 110 does not make the determination concerning the influence on the existing communications for the flows other than the flows N012 to N014 influenced by the setting change as presented in FIG. 12.

The influence determination unit 110 infers whether each of the changed flows N012 to N014 is used in the existing communications. For example, since the flow N012 is changed in the router 31, the influence determination unit 110 traces the flow N012 from the router 31 by using the data plane model 246 before the setting change. As a result, the influence determination unit 110 confirms that the flow N012 is not forwarded from the router 31 and determines that the flow N012 is discarded in the router 31. For example, the influence determination unit 110 determines that the flow N012 does not reach a subnet having 10.23.33.45, which is the destination of the flow N012. Thus, the influence determination unit 110 determines that the flow N012 is not used in the existing communications nor influences the existing communications.

Similarly, the influence determination unit 110 traces the other changed flows N013 and N014 by using the data plane model 246 before the setting change. In this case, the influence determination unit 110 determines that all the flows N012 to N014 are discarded in the router 31, and determines that all the flows N012 to N014 are not used in the existing communications nor influence the existing communications. Based on the above determination, the influence determination unit 110 determines that the setting change in the network 230 illustrated in FIG. 8 does not influence the existing communications.

Figure 13:
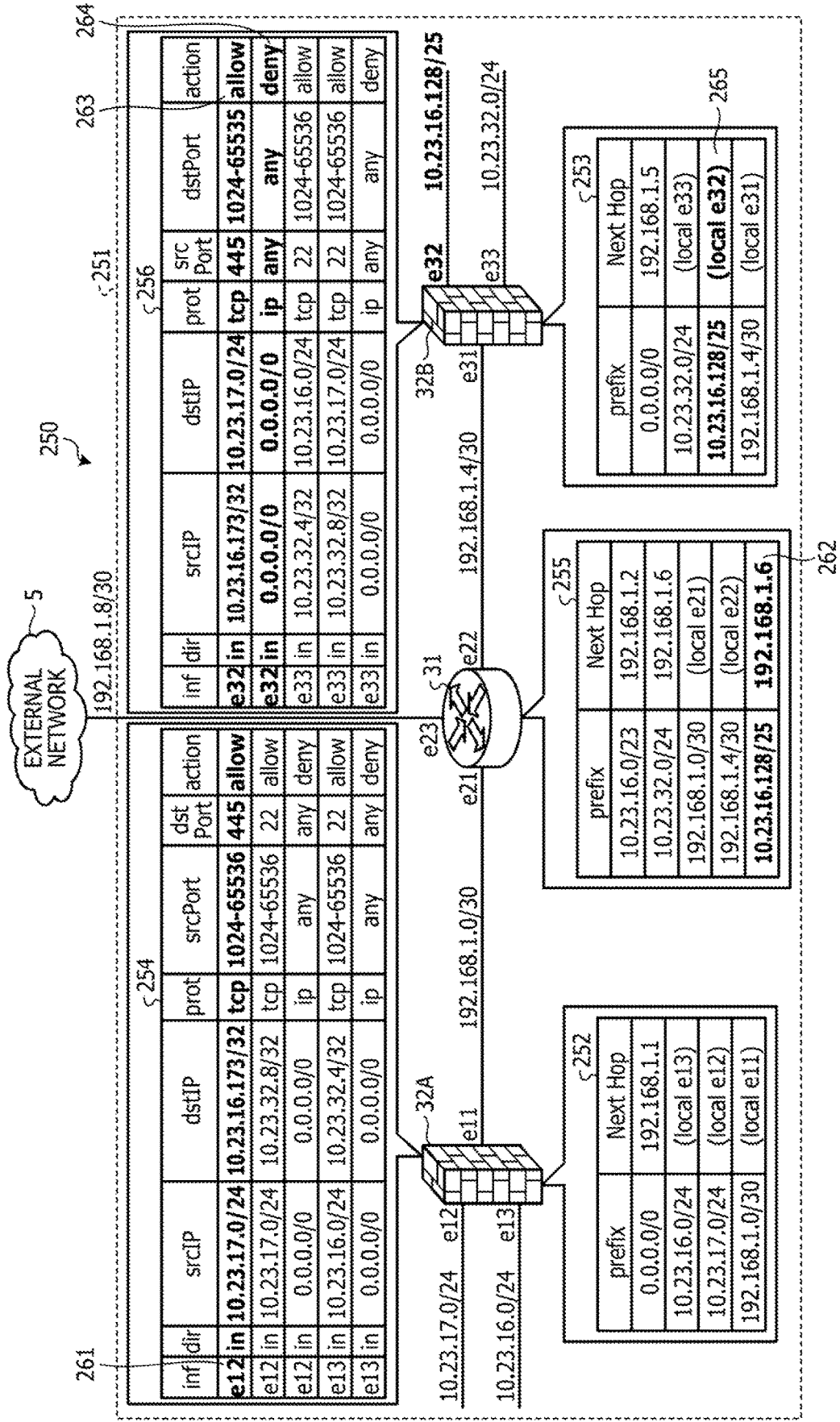
FIG. 13 is a diagram illustrating a second network for explaining a verification procedure.

FIG. 13 is a diagram illustrating a second network for explaining the verification procedure. A network 250 illustrated in FIG. 13 includes a router 31 and firewalls 32A and 32B. The router 31 is coupled to an external network 5. A range 251 is a modeling range for creating a data plane model of the network 250.

A forwarding table 255 is set in the router 31. A forwarding table 252 and a filtering rule 254 are set in the firewall 32A. A forwarding table 253 and a filtering rule 256 are set in the firewall 32B. In the network 250, interfaces and directions for which filtering rules are not set allow all packets to pass through.

A case where the following setting change request is made for the network 250 will be described. For example, a communication is newly opened between a port in the range of the TCP ports 1024 to 65535 of a certain host in a subnet coupled to the interface e12 of the firewall 32A and a TCP port 445 of a newly-installed server coupled to a subnet newly set in the interface e32 of the firewall 32B.

For this setting change request, the following setting change procedure is created. For example, a subnet having addresses 10.23.16.128/25 is allocated to the interface e32 of the firewall 32B. An IP address 10.23.16.173 is allocated to the newly-installed server. The post-setting change configuration generation unit 104 receives the input of this setting change procedure from the setting change procedure input unit 101.

The post-setting change configuration generation unit 104 generates the setting information after the setting change from the acquired setting change procedure and the setting information before the setting change of the router 31 and the firewalls 32A and 32B collected by the configuration information collection unit 105. From the setting information after the setting change, the post-setting change table estimation unit 103 generates the forwarding table 255 to which an entry 262 is added in FIG. 13. The ACL extraction unit 108 generates the filtering rule 256 to which entries 263 and 264 are added and the filtering rule 254 to which an entry 261 is added from the setting information of the router 31 and the firewalls 32A and 32B before and after the setting change.

This example is a case where a part of the subnet allocated to the interface e13 of the firewall 32A is erroneously allocated to the subnet newly set in the interface e32 of the firewall 32B and the erroneous allocation influences the existing communications. Such an error may be easily found manually in a small network like the network 250, but is difficult to find in a large network.

Figure 15:
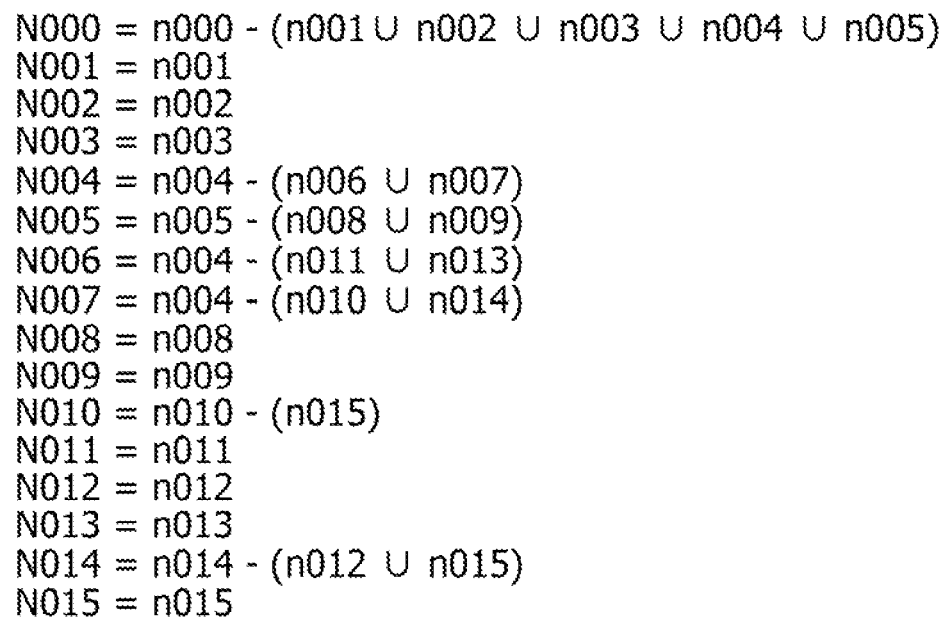
Figure 16:
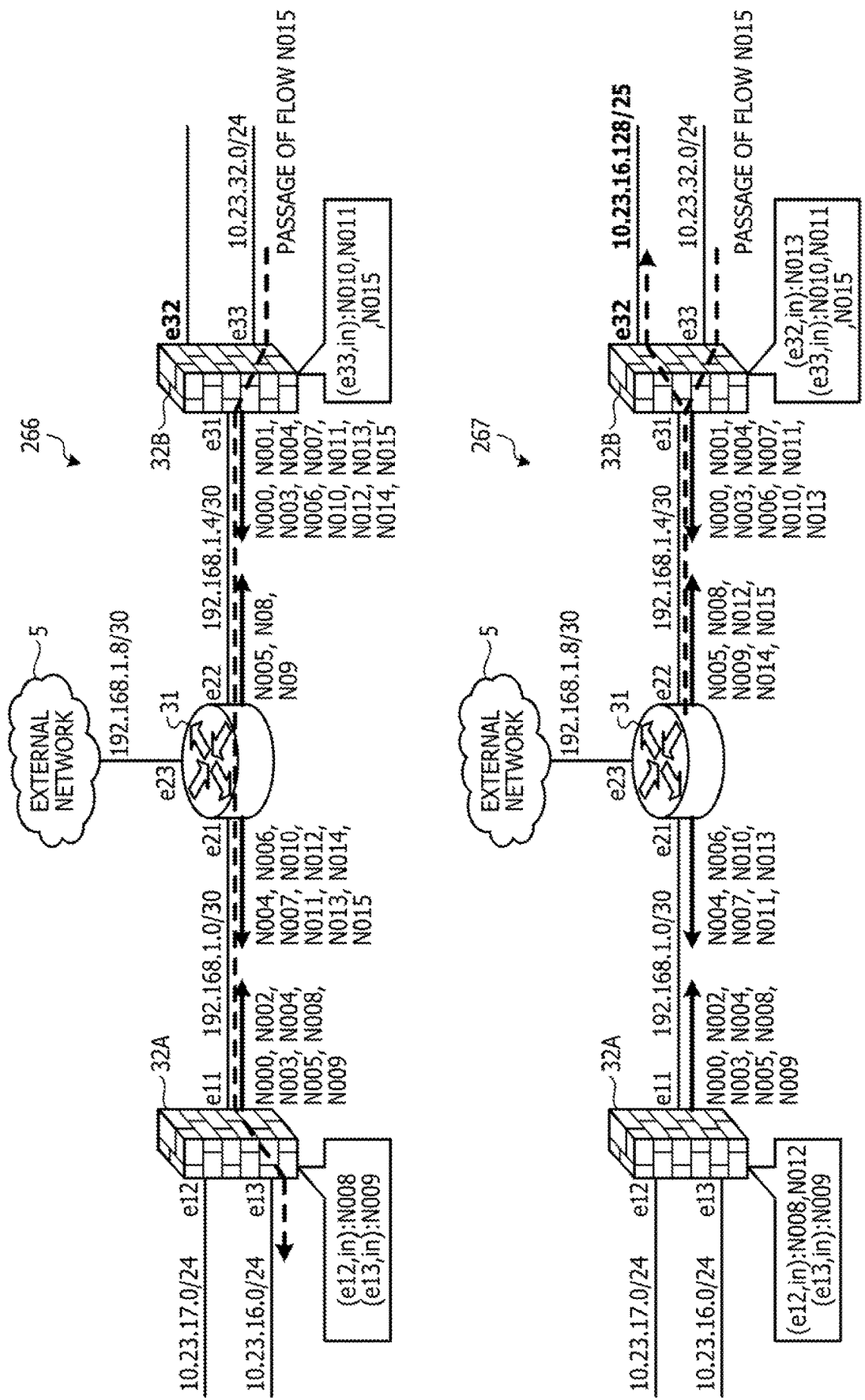
FIG. 16 is a diagram illustrating data plane models generated from the second network.

In order to find such an error, the network modeling unit 107 generates a meetsemilattice having elements illustrated in FIG. 14 from the information before and after the setting change in the forwarding tables 252, 253, and 255 and the information before and after the setting change in the filtering rules 254 and 256 illustrated in FIG. 13. FIG. 14 is a diagram illustrating the elements in the meetsemilattice generated from the second network. Each of elements n000 to n015 in FIG. 14 includes an element satisfying the conditions of respective items as indicated in the corresponding row. Next, the network modeling unit 107 generates PECs illustrated in FIG. 15 from the generated meetsemilattice. FIG. 15 is a diagram illustrating the PECs in the second network. The network modeling unit 107 generates the PECs representing flows N000 to N015 illustrated in FIG. 15. Using the generated PECs, the network modeling unit 107 generates a data plane model 266 before the setting change and a data plane model 267 after the setting change of the network 250 illustrated in FIG. 16. FIG. 16 is a diagram illustrating the data plane models generated from the second network.

Figure 17:
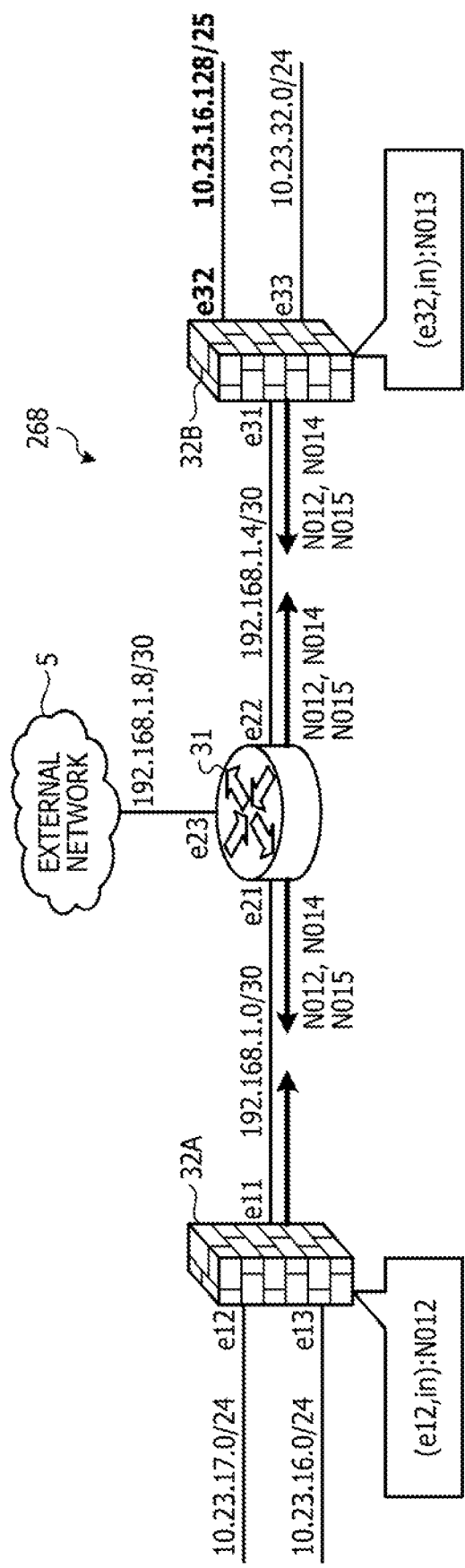
FIG. 17 is a diagram illustrating differences before and after a setting change in the second network.

As illustrated in FIG. 17, the difference extraction unit 109 extracts differences 268 between the data plane model 266 and the data plane model 267. FIG. 17 is a diagram illustrating the differences before and after the setting change in the second network. As indicated in the differences 268, the flows N012, N014, and N015 are changed in the router 31 due to this setting change. The flows N012, N013, N014, and N015 are changed in the firewall 32B. The flow N012 is changed in the firewall 32A. The flows other than the above flows are unchanged before and after the setting change. The influence determination unit 110 does not make the determination concerning the influence on the existing communications for the flows other than the flows N012 to N015 influenced by the setting change as presented in the differences 268.

The influence determination unit 110 infers whether each of the changed flows N012 to N015 is used in the existing communications. For example, since the flow N012 is changed in the router 31, the influence determination unit 110 traces the flow N012 from the router 31 by using the data plane model 266 before the setting change. As a result, the influence determination unit 110 determines that the flow N012 is sent to the interface e13 of the firewall 32A and reaches the subnet having 10.23.16.173/32, which is the destination address of the flow N012, in the interface e13.

Since the destination address is included in the reached point, the influence determination unit 110 determines that the flow N012 is highly likely to be used in the existing communications. Next, the influence determination unit 110 traces the same flow N012 from the router 31 by using the data plane model 267 after the setting change. In this case, the influence determination unit 110 determines that the flow N012 is sent to the interface e32 of the firewall 32B and reaches the subnet including 10.23.16.173/32, which is the destination address of the flow N012, in the firewall 32B. Since the reached point of the flow N012, which is highly likely to be used in the existing communications, is changed, the influence determination unit 110 determines that the setting change for the flow N012 influences any of the existing communications. The influence determination unit 110 determines that the influenced existing communication is the communication included in the flow N012.

For example, in the case of the flow N015, the influence determination unit 110 traces the flow N015 by using the data plane model 266 before the setting change. As a result, the influence determination unit 110 determines that the flow N015 reaches the subnet having 10.23.16.0/24, which is the destination address thereof, through the firewall 32B, the router 31, and the firewall 32A as indicated by a broken line arrow in the data plane model 266 illustrated in FIG. 16.

Since the destination address is included in the reached point, the influence determination unit 110 determines that the flow N015 is highly likely to be used in the existing communications. Next, the influence determination unit 110 traces the same flow N015 by using the data plane model 267 after the setting change. In this case, the influence determination unit 110 determines that the flow N015 is not forwarded beyond the router 31 but reaches the subnet having 10.23.16.128/25, which is the destination address of the flow N015, in the firewall 32B as indicated by a broken line arrow in the data plane model 267 in FIG. 16. Since the reached point of the flow N015, which is highly likely to be used in the existing communications, is changed, the influence determination unit 110 determines that the setting change for the flow N015 influences any of the existing communications. The influence determination unit 110 determines that the influenced existing communication is the communication included in the flow N015.

The influence determination unit 110 also performs the verification for the other changed flows N013 and N014 in the same way, and determines that the flow N014 also influences the existing communications. In this case, it is preferable that the administrator of the network 2 modify the setting change procedure in accordance with the determination results by the influence determination unit 110 such that the setting change procedure will not influence the flows N012, N014, and N015.

Figure 18:
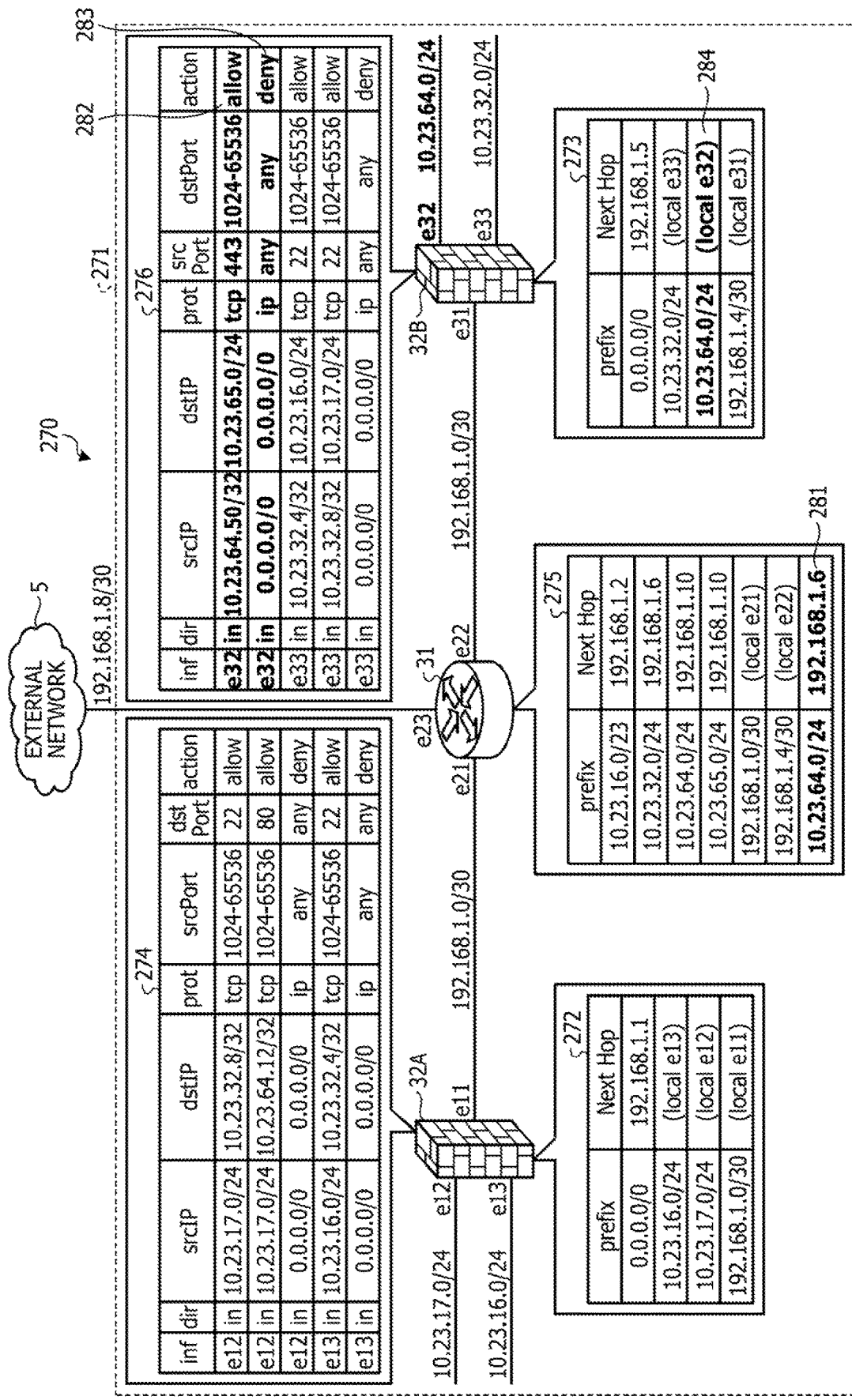
FIG. 18 is a diagram illustrating a third network for explaining a verification procedure.

FIG. 18 is a diagram illustrating a third network for explaining the verification procedure. A network 270 illustrated in FIG. 18 includes a router 31 and firewalls 32A and 32B. The router 31 is coupled to an external network 5. A range 271 is a modeling range for creating a data plane model of the network 270.

A forwarding table 275 is set in the router 31. A forwarding table 272 and a filtering rule 274 are set in the firewall 32A. A forwarding table 273 and a filtering rule 276 are set in the firewall 32B. In the network 270, interfaces and directions for which filtering rules are not set allow all packets to pass through.

A case where the following setting change request is made for the network 270 will be described. For example, a communication is newly opened between a port in a range of TCP ports 1024 to 65535 of a certain host in a subnet having 10.23.65.0/24 in the external network 5 coupled to the interface e23 of the router 31 and a TCP port 443 of a newly-installed server coupled to a subnet newly set in the interface e32 of the firewall 32B.

For this setting change request, the following setting change procedure is created. For example, a subnet having addresses 10.23.64.0/24 is allocated to the interface e32 of the firewall 32B. An IP address 10.23.64.50 is allocated to the newly installed server. The post-setting change configuration generation unit 104 receives the input of this setting change procedure from the setting change procedure input unit 101.

The post-setting change configuration generation unit 104 generates the setting information after the setting change from the acquired setting change procedure and the setting information before the setting change of the router 31 and the firewalls 32A and 32B collected by the configuration information collection unit 105. From the setting information after the setting change, the post-setting change table estimation unit 103 generates the forwarding table 275 to which an entry 281 is added and the forwarding table 273 to which an entry 284 is added in FIG. 18. The ACL extraction unit 108 extracts the filtering information before and after the setting change from the setting information of the router 31 and the firewalls 32A and 32B before and after the setting change. The ACL extraction unit 108 adds entries 282 and 283 as the filtering information after the setting change.

This example is a case where a part of the subnet that is likely to be used in the external network 5 coupled to the interface e23 of the router 31 is erroneously allocated to the subnet newly set in the interface e32 of the firewall 32B and the erroneous allocation may influence the existing communications. Such a change that may influence the existing communications may be easily found manually in a small network like the network 270, but is difficult to find in a large network.

Figure 20:
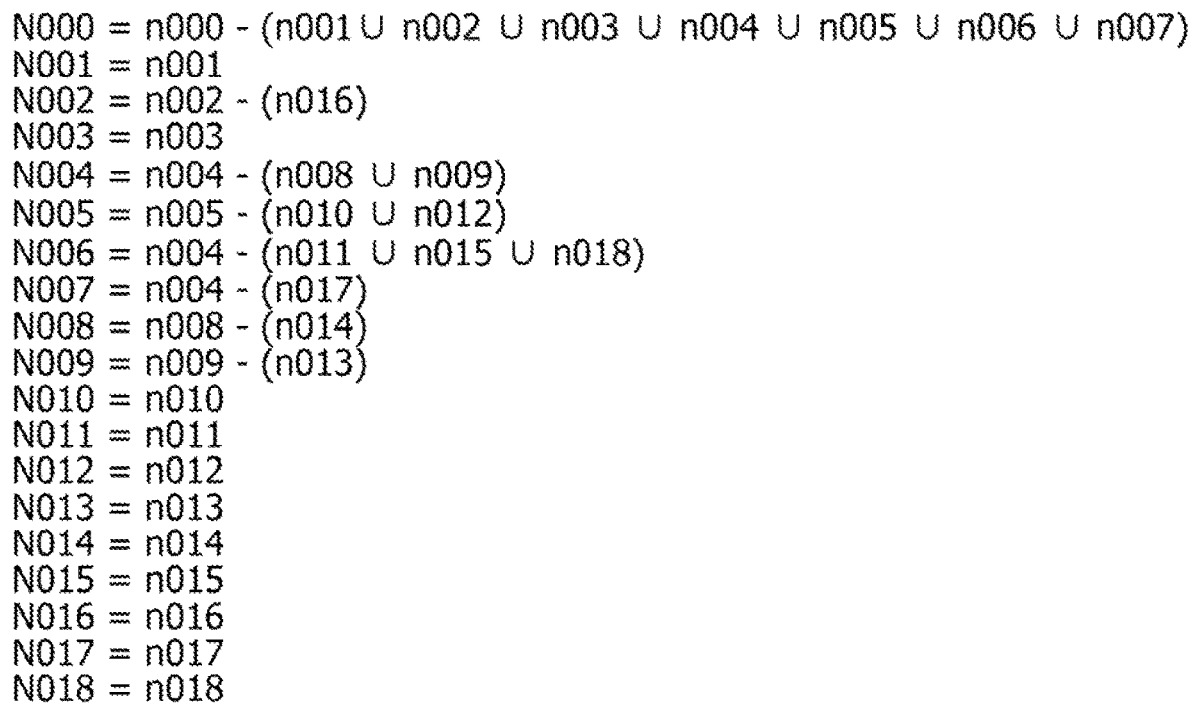
Figure 21:
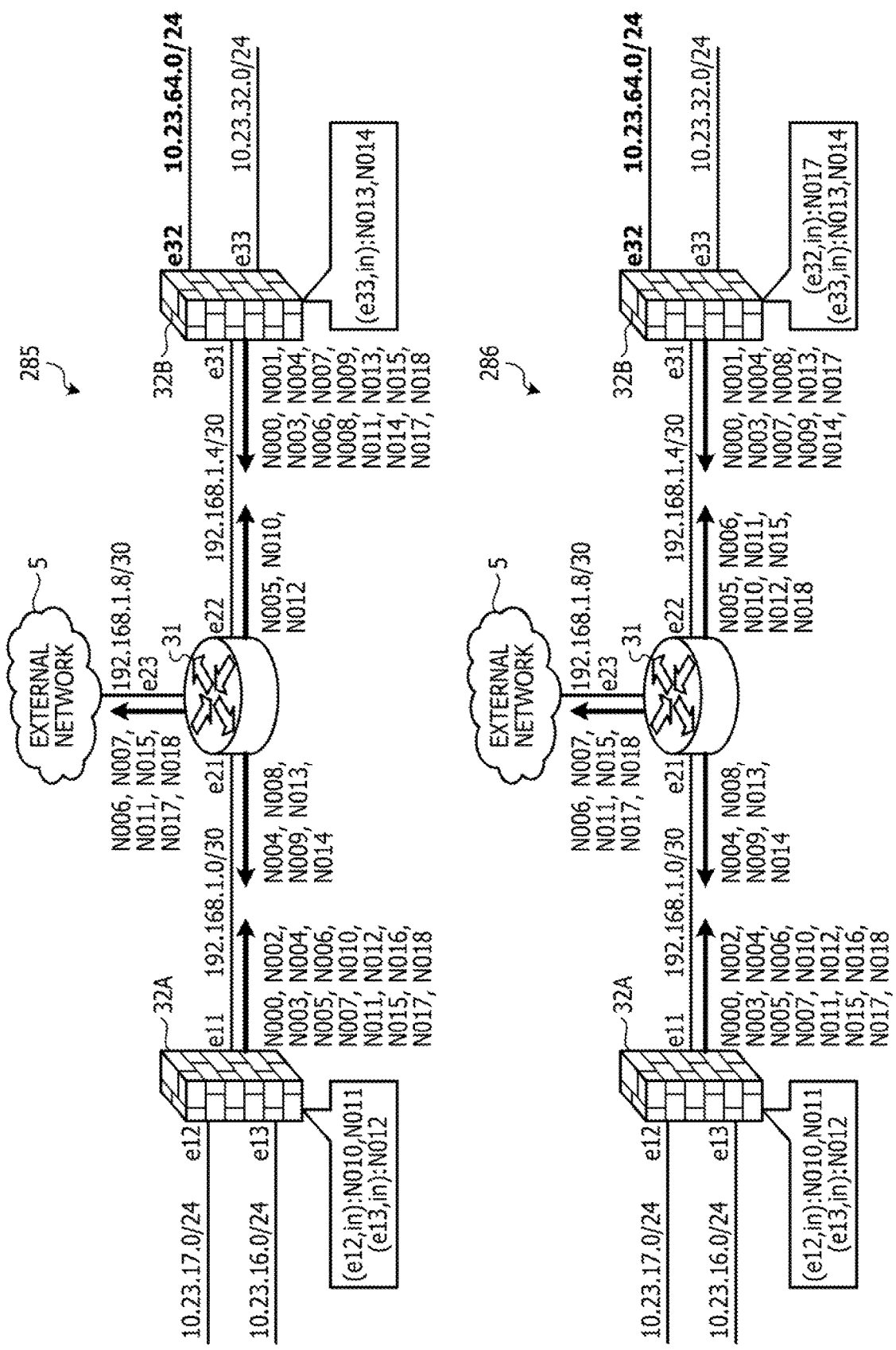
FIG. 21 is a diagram illustrating data plane models generated from the third network.

In order to find such an error, the network modeling unit 107 generates a meetsemilattice having elements illustrated in FIG. 19 from the information before and after the setting change in the forwarding tables 272, 273, and 275 and the information before and after the setting change in the filtering rules 274 and 276 illustrated in FIG. 18. FIG. 19 is a diagram illustrating the elements in the meetsemilattice generated from the third network. Each of elements n000 to n018 in FIG. 19 includes an element satisfying the conditions of respective items as indicated in the corresponding row. Next, the network modeling unit 107 generates PECs illustrated in FIG. 20 from the generated meetsemilattice. FIG. 20 is a diagram illustrating the PECs in the third network. The network modeling unit 107 generates the PECs representing flows N000 to N018 illustrated in FIG. 20. Using the generated PECs, the network modeling unit 107 generates a data plane model 285 before the setting change and a data plane model 286 after the setting change of the network 270 illustrated in FIG. 21. FIG. 21 is a diagram illustrating the data plane models generated from the third network.

Figure 22:
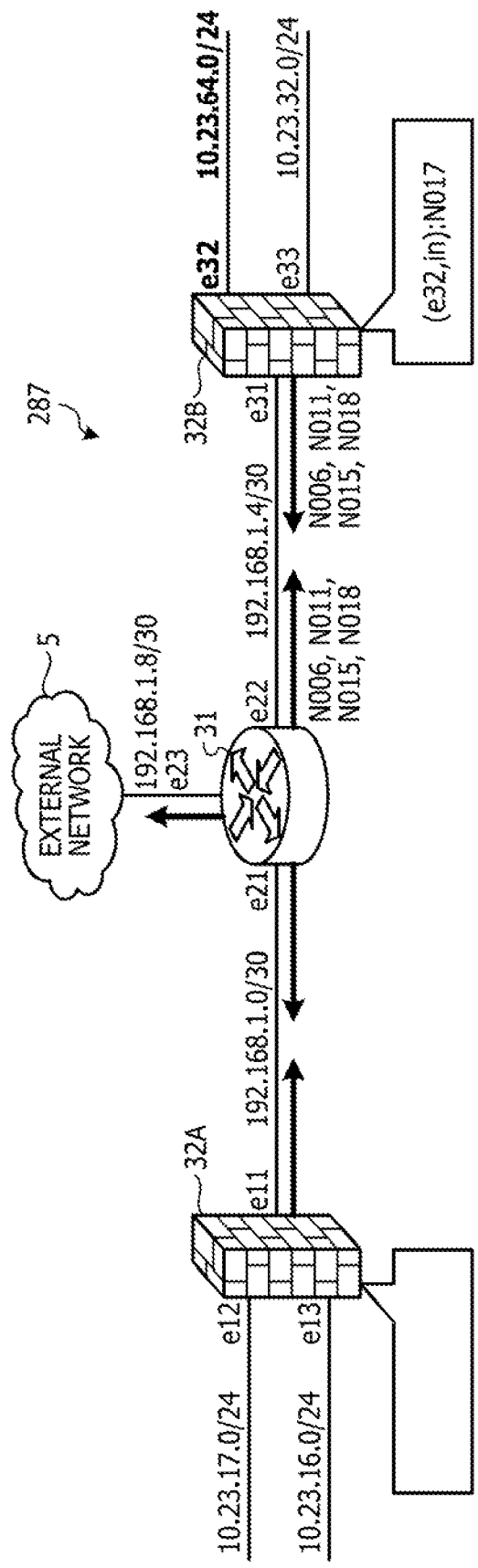
FIG. 22 is a diagram illustrating differences before and after a setting change in the third network.

As illustrated in FIG. 22, the difference extraction unit 109 extracts differences 287 between the data plane model 285 and the data plane model 286. FIG. 22 is a diagram illustrating the differences before and after the setting change in the third network. As indicated in the differences 287, the flows N006, N011, N015, and N018 are changed in the router 31 due to this setting change. The flows N006, N011, N015, N017, and N018 are changed in the firewall 32B. The flows other than the above flows are unchanged before and after the setting change. The influence determination unit 110 does not make the determination concerning the influence on the existing communications for the flows other than the flows N006, N011, N015, N017, and N018 influenced by the setting change as presented in FIG. 22.

The influence determination unit 110 infers whether or not each of the changed flows N006, N011, N015, N017, and N018 is used in the existing communications. For example, since the flow N011 is changed in the router 31, the influence determination unit 110 traces the flow N011 from the router 31 by using the data plane model 285 before the setting change. As a result, the influence determination unit 110 confirms that the flow N011 is sent from the interface e23 of the router 31 to the external network 5.

Next, the influence determination unit 110 traces the same flow N011 from the router 31 by using the data plane model 286 after the setting change. As a result, the influence determination unit 110 confirms that the flow N011 is divided into two flows, one of which is sent from the interface e23 of the router 31 to the external network 5 and the other of which reaches the subnet in the firewall 32B. Thus, the influence determination unit 110 determines that the reached point of the flow N011 is changed before and after the setting change.

The influence determination unit 110 confirms that the flow N011 passes through the firewall 32A in the data plane model 285. Thus, the flow N011 is likely to be used in the existing communications. Since the flow N011 that is likely to be used in the existing communications is changed before and after the setting change, the influence determination unit 110 determines to take any one of a measure to inquire of an administrator of the external network 5 the usage state of the flow N011 and a measure to notify an administrator of the network 270 of an instruction to modify the setting change procedure such that the setting change procedure will not influence the flow N011.

For the other changed flows N006, N015, N017, and N018, the influence determination unit 110 also performs the verification and makes the determination concerning the influence on the existing communications in the same way.

Figure 23:
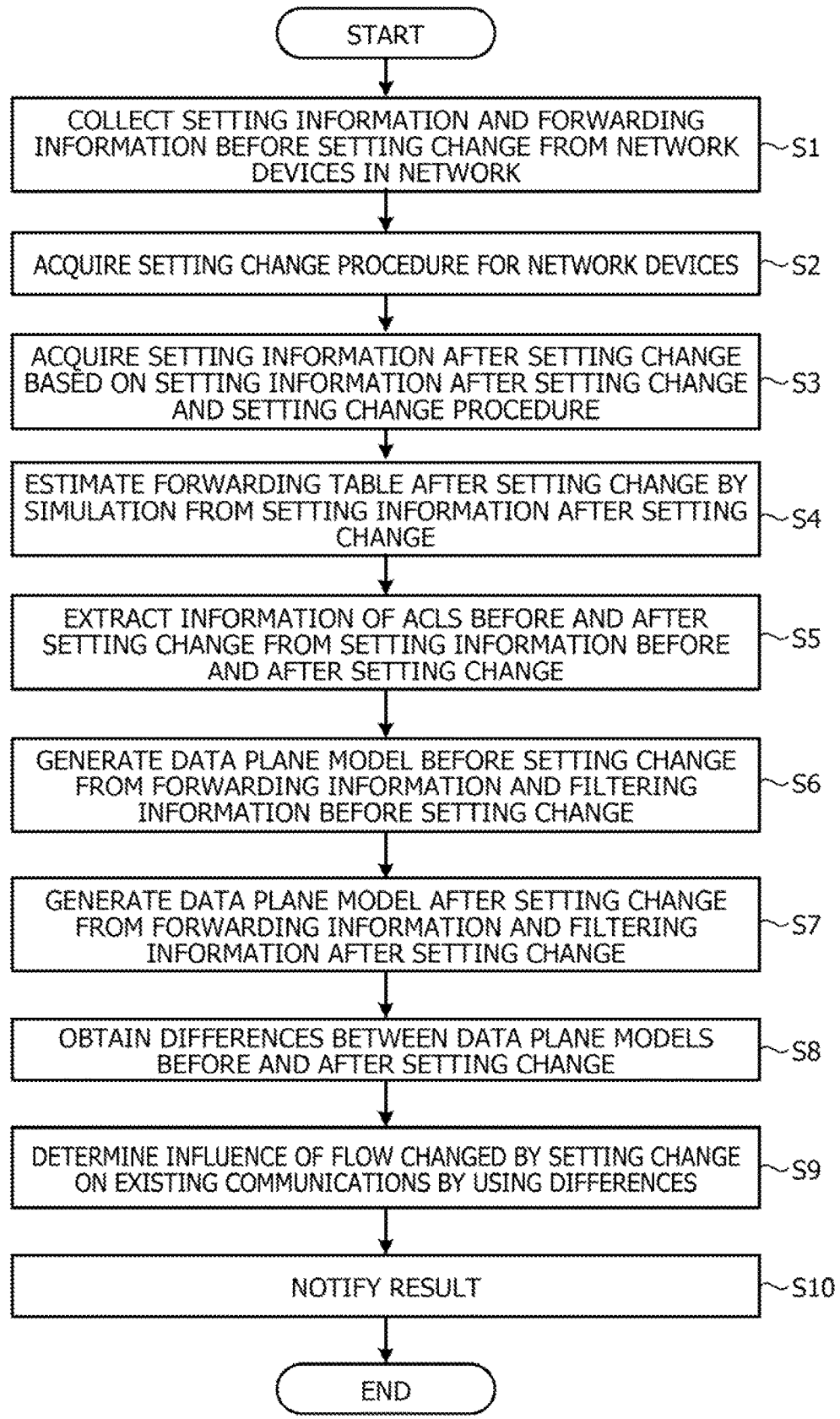
FIG. 23 is a flowchart of an entire verification process by a network verification apparatus according to Embodiment 1.

Next, an entire sequence of the verification process by the network verification apparatus 1 according to the present embodiment will be described with reference to FIG. 23. FIG. 23 is a flowchart of the entire verification process by the network verification apparatus according to Embodiment 1.

The configuration information collection unit 105 collects the setting information before a setting change from the network devices such as the routers 31 and the firewalls 32 in the network 2. The table information collection unit 106 collects the forwarding information stored in the forwarding tables from the network devices (step S1).

The post-setting change configuration generation unit 104 acquires the setting information before the setting change from the configuration information collection unit 105. The post-setting change configuration generation unit 104 acquires a setting change procedure for the network devices in the network 2 from the setting change procedure input unit 101 (step S2).

Next, the post-setting change configuration generation unit 104 obtains the setting information after the setting change based on the setting information before the setting change and the setting change procedure (step S3).

The post-setting change table estimation unit 103 acquires the setting information after the setting change from the post-setting change configuration generation unit 104. The post-setting change table estimation unit 103 estimates the forwarding tables after the setting change by simulation from the setting information after the setting change (step S4).

The ACL extraction unit 108 acquires the setting information before the setting change from the configuration information collection unit 105. The ACL extraction unit 108 acquires the setting information after the setting change from the post-setting change configuration generation unit 104. Thereafter, the ACL extraction unit 108 extracts information of the ACLS before the setting change and the ACLS after the setting change from the setting information before and after the setting change (step S5).

The network modeling unit 107 acquires the forwarding information before the setting change from the table information collection unit 106. The network modeling unit 107 obtains the filtering information before the setting change from the ACLs before the setting change extracted by the ACL extraction unit 108. The network modeling unit 107 generates a data plane model before the setting change of the network 2 from the forwarding information and the filtering information before the setting change (step S6).

Next, the network modeling unit 107 acquires the forwarding information after the setting change from the forwarding tables after the setting change estimated by the post-setting change table estimation unit 103. The network modeling unit 107 obtains the filtering information after the setting change from the ACLs after the setting change extracted by the ACL extraction unit 108. The network modeling unit 107 generates a data plane model after the setting change of the network 2 from the forwarding information and the filtering information after the setting change (step S7).

The difference extraction unit 109 acquires the data plane models before and after the setting change from the network modeling unit 107. The difference extraction unit 109 obtains differences between the data plane model before the setting change and the data plane model after the setting change (step S8).

The influence determination unit 110 acquires the differences between the data plane models before and after the setting change from the difference extraction unit 109. The influence determination unit 110 identifies flows changed by the setting change based on the differences before and after the setting change. Thereafter, the influence determination unit 110 makes determination concerning the influence of each of the flows changed by the setting change on the existing communications (step S9).

The output unit 111 acquires the determination results of the influence of the flows changed by the setting change on the existing communications from the influence determination unit 110. The output unit 111 notifies the administrator of the network 2 of the determination results of the influence of the flows changed by the setting change on the existing communications (step S10).

Figure 24:
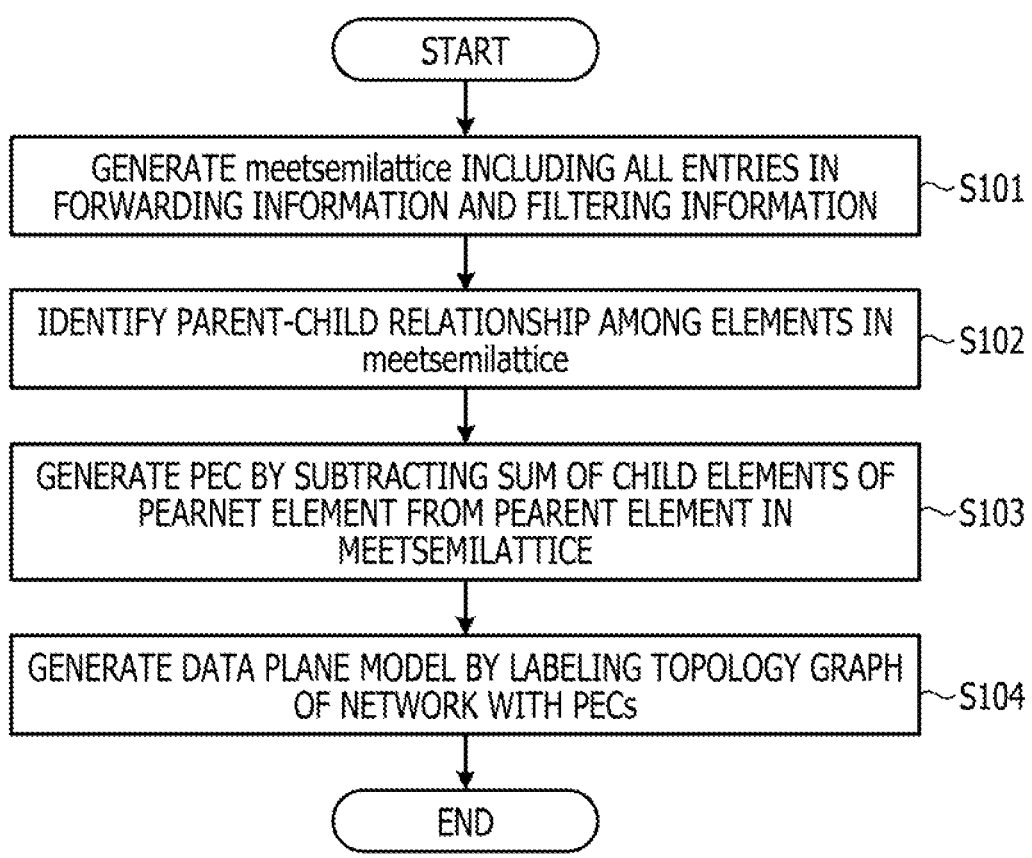
FIG. 24 is a flowchart of a data plane model creation process.

Next, a sequence of a data plane model creation process will be described with reference to FIG. 24. FIG. 24 is a flowchart of the data plane model creation process. The process presented in the flowchart of FIG. 24 is an example of the process executed in steps S6 and S7 in FIG. 23.

The network modeling unit 107 generates a meetsemilattice including, as elements, all entries in the forwarding information and the filtering information of the network devices included in the network 2 (step S101).

Next, the network modeling unit 107 identifies the parent-child relationships among all the elements in the generated meetsemilattice (step S102).

Next, the network modeling unit 107 generates each PEC by subtracting a sum of child elements of a parent element from the parent element in the meetsemilattice (step S103).

Next, the network modeling unit 107 labels a topology graph of the network 2 with the generated PECs to create a data plane model (step S104).

Figure 25A:
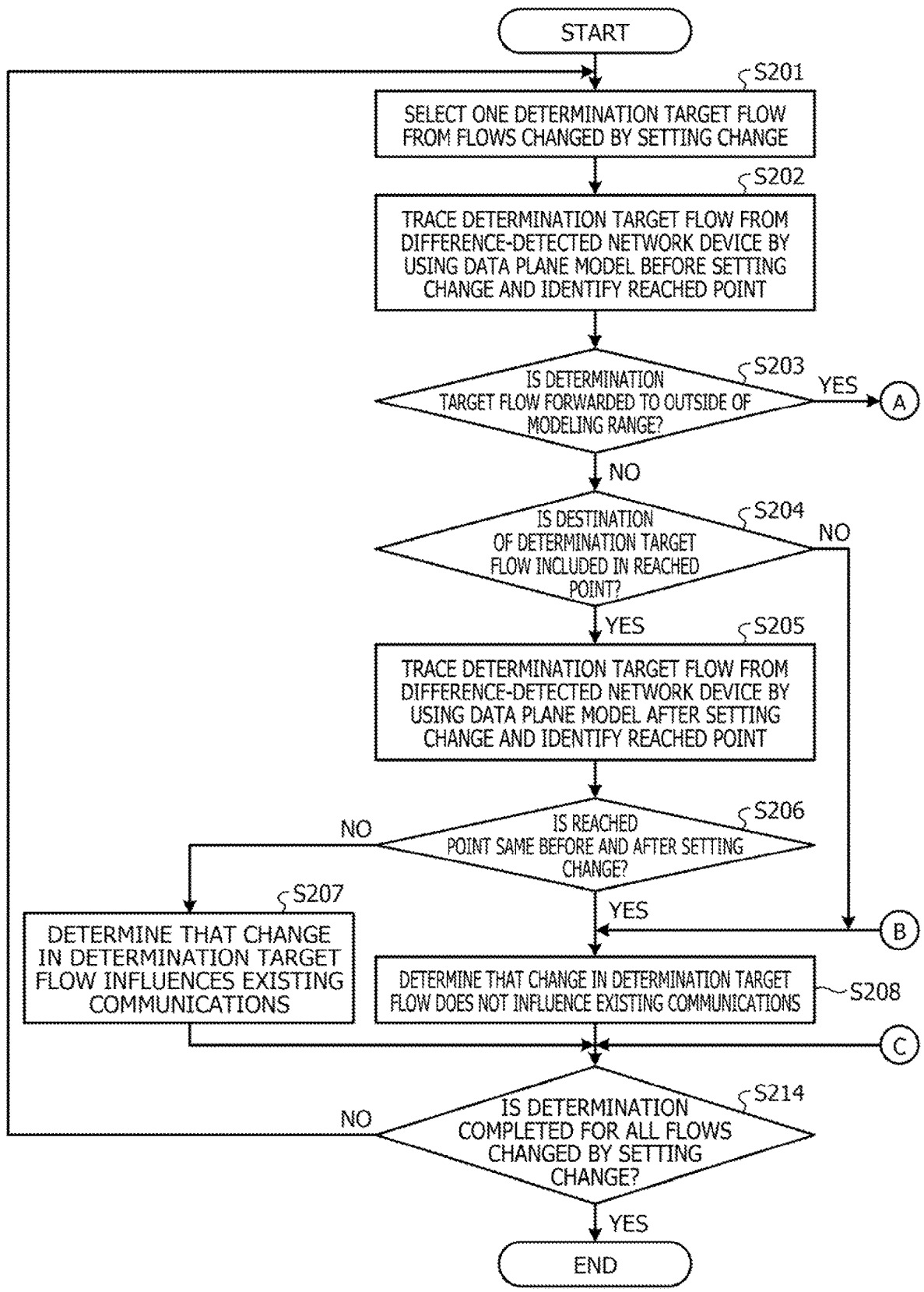
FIG. 25A is a first flowchart of a determination process concerning influence on existing communications.
Figure 25B:
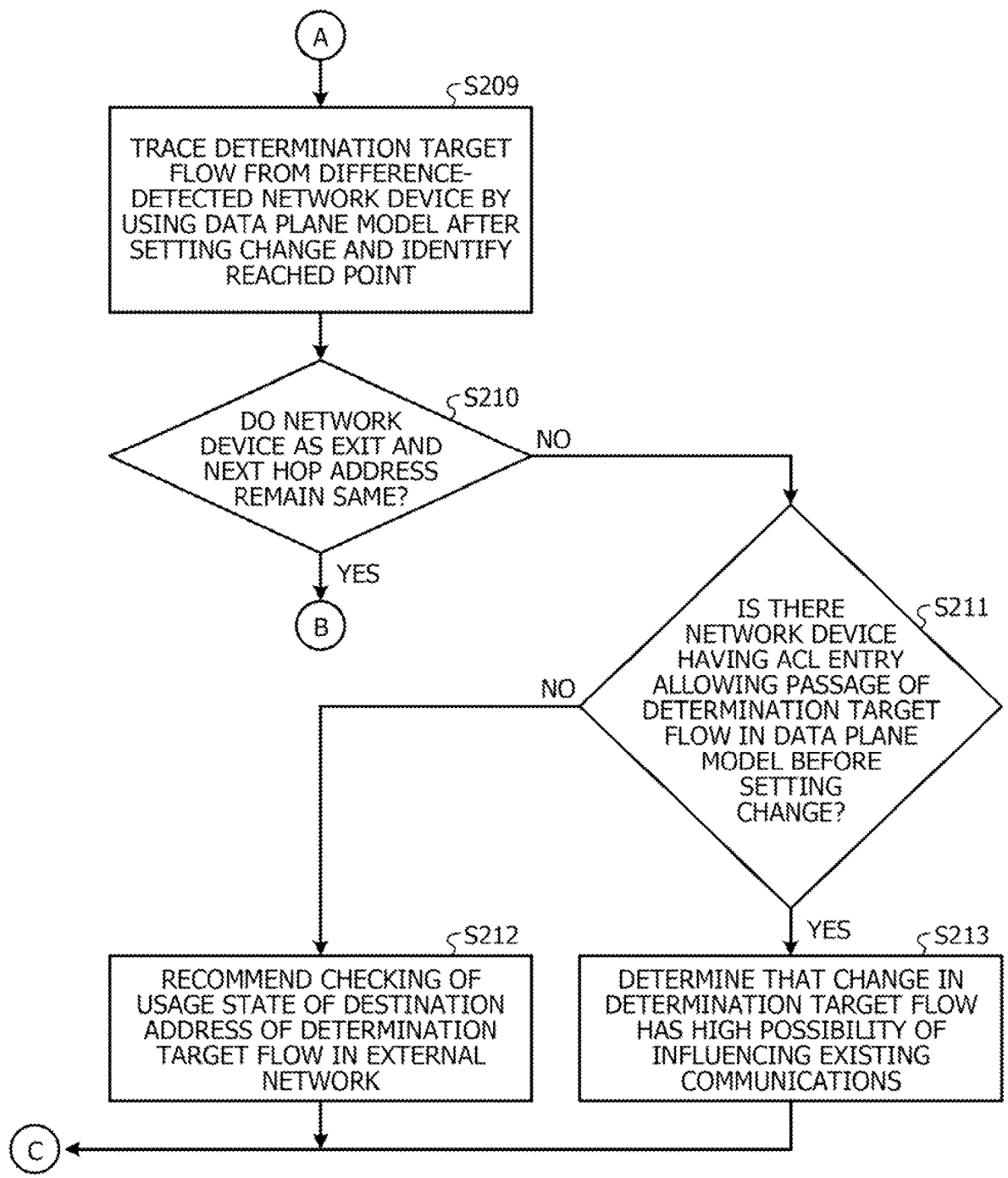
FIG. 25B is a second flowchart of the determination process concerning the influence on the existing communications.

Next, a sequence of a determination process concerning influence on existing communications by the influence determination unit 110 will be described with reference to FIGS. 25A and 25B. FIG. 25A is a first flowchart of the determination process concerning the influence on the existing communications. FIG. 25B is a second flowchart of the determination process concerning the influence on the existing communications. The process presented in the flowcharts of FIGS. 25A and 25B is an example of the process executed in step S9 in FIG. 23.

The influence determination unit 110 selects one determination target flow from among the flows changed by the setting change (step S201).

Next, by using the data plane model of the network 2 before the setting change, the influence determination unit 110 traces the determination target flow from the difference-detected network device and identifies the reached point of the determination target flow (step S202).

Next, the influence determination unit 110 determines whether or not the determination target flow is forwarded to the outside of the modeling range of the network 2 in the data plane model before the setting change based on the reached point of the determination target flow in the data plane model before the setting change (step S203).

If the determination target flow is not forwarded to the outside of the modeling range (step S203: No), the influence determination unit 110 determines whether or not the reached point of the determination target flow includes the destination of the determination target flow (step S204). If the reached point of the determination target flow does not include the destination of the determination target flow (step S204: No), the influence determination process by the influence determination unit 110 proceeds to step S208.

On the other hand, if the reached point of the determination target flow includes the destination of the determination target flow (step S204: Yes), the influence determination unit 110 traces the determination target flow from the difference-detected network device by using the data plane model of the network 2 after the setting change and identifies the reached point of the determination target flow (step S205).

Next, the influence determination unit 110 determines whether or not the reached points of the determination target flow before and after the setting change are the same (step S206).

If the reached points of the determination target flow before and after the setting change are not the same (step S206: No), the influence determination unit 110 determines that the change in the determination target flow influences the existing communications (step S207). After that, the process proceeds to step S214.

If the reached point of the determination target flow does not include the destination (step S204: No), the influence determination unit 110 determines that the change in the determination target flow does not influence the existing communications (step S208). Similarly, if the reached points of the determination target flow before and after the setting change are the same (step S206: Yes), the influence determination unit 110 determines that the change in the determination target flow does not influence the existing communications (step S208). After that, the process proceeds to step S214.

On the other hand, if the determination target flow is forwarded to the outside of the modeling range (step S203: Yes), the influence determination unit 110 proceeds to step S209 in FIG. 25B and executes the following process. By using the data plane model of the network 2 after the setting change, the influence determination unit 110 traces the determination target flow from the difference-detected network device and Identifies the reached point of the determination target flow (step S209).

Next, the influence determination unit 110 determines whether or not the network device serving as an exit from which the determination target flow is forwarded to the outside of the modeling range and the next hop address of the determination target flow from the network device remain the same before and after the setting change (step S210).

If the network device serving as the exit to the outside of the modeling range and the next hop address remain the same (step S210: Yes), the influence determination unit 110 proceeds to step S208 in FIG. 25A and determines that the change in the determination target flow does not influence the existing communications.

If the network device serving as the exit to the outside of the modeling range or the next hop address is different (step S210: No), the influence determination unit 110 executes the following process. The influence determination unit 110 determines whether or not there is a network device having an ACL entry allowing a passage of the determination target flow in the data plane model before the setting change (step S211).

When there is no network device having an ACL entry allowing a passage of the determination target flow (step S211: No), the influence determination unit 110 determines to recommend checking the usage state of the destination address of the determination target flow in the external network (step S212). After that, the process proceeds to step S214 in FIG. 25A.

If there is the network device having the ACL entry allowing a passage of the determination target flow (step S211: Yes), the influence determination unit 110 determines that the change in the determination target flow has a high possibility of influencing the existing communications (step S213). After that, the process proceeds to step S214 in FIG. 25A.

The influence determination unit 110 determines whether or not the determination is completed for all the flows changed by the setting change (step S214). If there is a flow for which the determination is yet to be made (step S214: No), the influence determination unit 110 proceeds to step S201. On the other hand, if the determination is completed for all the flows (step S214: Yes), the influence determination unit 110 ends the determination process concerning the influence on the existing communications.

As described above, the network verification apparatus according to the present embodiment creates the models of the network by extracting flows each including packets that behave in the same manner in the network from the setting information and the information in the forwarding tables of the network devices. The network verification apparatus regards a flow that remains unchanged before and after the setting change in the generated models as a flow not influenced by the setting change, and excludes the flow from verification targets. Thereafter, by using the model of the IP network before the setting change, the network verification apparatus infers whether each flow is used in the existing communications. This makes it possible to avoid an increase in the time for the verification depending on the volume of existing communications used in the IP network before the setting change. This also makes it possible to perform more overall check of the influence on the existing communications even without a list of existing communications. Therefore, overall and efficient network verification is achievable.

Embodiment 2

Next, Embodiment 2 will be described. In carrier networks and the like, addition and deletion of lines and sites, a capacity change for a line speed-up, and the like are often conducted based on contracts with customers. In order to carry out these work operations without errors, it is preferable to verify a network change in advance and confirm that existing communications will not be influenced. However, when the influence on the existing communications is manually checked, the overall check is difficult and a human error may occur.

For example, in the case of a capacity change, two work operation procedures of deleting the settings for an old site in an old customer accommodating router (provider edge router (PE)) and adding the settings for a new site in a new customer accommodating router on a carrier side are consecutively performed. Thus, when the network verification is executed for a capadty change, the deletion of the old site and the addition of the new site are verified in sequence. Among flows in the network in which the capacity change is to be performed, there are a flow in which a change after the setting change is acceptable and a flow in which a change after the setting change is unacceptable.

The network verification apparatus according to Embodiment 1 performs the network verification once for a single work operation and completes the verification. In contrast, in the case of addition and deletion of a line and a site and a capacity change, the two work operation procedures are performed as described above. For this reason, the network verification apparatus according to Embodiment 1 repeats the verification described in Embodiment 1 twice. In this method, the second verification for the second setting change is performed on the network after the first setting change. In the second verification, the network information to which the setting change made in the first work operation is added is manually created, and then the verification for the addition of the new site is performed. In the case of a capacity change, it is preferable to verify whether or not all the flows passing through an old site are changed to flows passing through a new site. However, in the case where the network verification apparatus according to Embodiment 1 is used, the first verification and the second verification are executed separately. For this reason, the information of the PECs may be also changed. To address this, an administrator has to visually check the PECs in the first verification and the PECs in the second verification against each other to verify whether all the flows passing through the old site are changed to flows passing through the new site. For this reason, when two or more setting changes are consecutively made and the verification is performed for each of the two or more setting changes, the network verification apparatus in Embodiment 1 requests a large number of man-hours for the verification for the capacity change and accordingly is poor in the efficiency.

Figure 26:
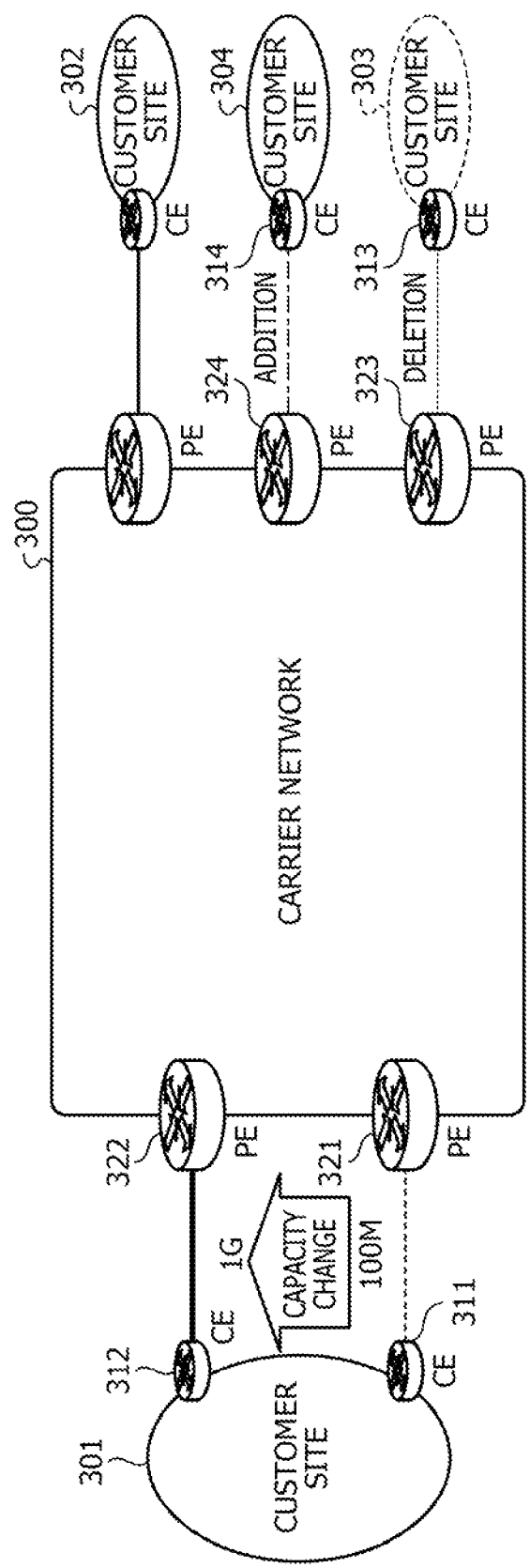
FIG. 26 is a diagram illustrating examples of a capacity change and a site change.

FIG. 26 illustrates examples of a capacity change and a site change. For example, a case where there are a carrier network 300 and plurality of customer sites including customer sites 301 to 303 will be described. The customer site 301 is coupled to the carrier network 300 at a line speed of 100 Mb/s by using a customer-side carrier coupling router (customer edge router: CE) 311 and a customer accommodating router 321. In this state, the capacity change is executed such that the customer site 301 will be coupled to the carrier network 300 at a line speed of 1 Gb/s by using a carrier coupling router 312 and a customer accommodating router 322.

Addition and deletion of a customer site and a line are performed as follows. For example, a line linking the carrier network 300 and the customer site 303 by using a customer-side carrier coupling router 313 and a customer accommodating router 323 is deleted. A line linking the carrier network 300 and a customer site 304 by using a customer-side carrier coupling router 314 and a customer accommodating router 324 is newly added.

In the work operations described above, it is preferable to make two or more setting changes consecutively and verify the setting changes in sequence to check whether each of the setting changes is appropriately made. Hereinafter, an operation of a network verification apparatus 1 according to the present embodiment will be described by taking the capacity change in the customer site 301 as an example. The network verification apparatus 1 according to the present embodiment is also illustrated in the block diagram of FIG. 1. The carrier network 300 described herein serves as the network 2 in FIG. 1. In the following description, the description of the same operations as the operations of the units in Embodiment 1 will be omitted. In the following description, a deletion of the customer accommodating router 321 and an addition of the customer accommodating router 322 in a capacity change will be referred to as the "first setting change" and the "second setting change", respectively. The state of the carrier network 300 before the first setting change will be referred to as an "initial state".

In the network verification for the first setting change, the network modeling unit 107 generates a data plane model of the carrier network 300 before the first setting change by using the forwarding information and the filtering information of the network devices in the initial state. The network modeling unit 107 generates a data plane model of the carrier network 300 after the first setting change by using the forwarding information and the filtering information of the network devices after the first setting change. The network modeling unit 107 outputs the data plane models before and after the first setting change to the difference extraction unit 109. The network modeling unit 107 holds the data plane model after the first setting change.

In the network verification for the second setting change after the completion of the network verification for the first setting change, the network modeling unit 107 sets the generated data plane model after the first setting change as a data plane model of the carrier network 300 before the second setting change. The network modeling unit 107 generates a data plane model of the carrier network 300 after the second setting change by using the forwarding information and the filtering information of the network devices after the second setting change. The network modeling unit 107 outputs the data plane models before and after the second setting change to the difference extraction unit 109.

In the network verification for the first setting change, the difference extraction unit 109 acquires the data plane models before and after the first setting change from the network modeling unit 107. The difference extraction unit 109 extracts differences between the data plane models before and after the first setting change. After that, the difference extraction unit 109 outputs the extracted differences between the data plane models before and after the first setting change to the influence determination unit 110.

Next, in the network verification for the second setting change after the completion of the network verification for the first setting change, the difference extraction unit 109 acquires the data plane models before and after the second setting change from the network modeling unit 107. The difference extraction unit 109 extracts differences between the data plane models before and after the second setting change. Thereafter, the difference extraction unit 109 outputs the extracted differences between the data plane models before and after the second setting change to the influence determination unit 110.

In the network verification for the first setting change, the influence determination unit 110 receives the input of the differences between the data plane models before and after the first setting change from the difference extraction unit 109. The influence determination unit 110 stores flows changed by the first setting change. Next, the influence determination unit 110 uses the data plane models before and after the first setting change to make the determination concerning the influence of each of the flows changed by the first setting change on the existing communications.

Thereafter, the influence determination unit 110 determines whether or not the capacity change process is completed. For example, the influence determination unit 110 holds the number of consecutive setting changes in advance, and determines that the process is completed when the number of times of the verification execution reaches the number of setting changes.

If the capacity change process is not completed, the influence determination unit 110 performs the network verification for the second setting change. For example, the influence determination unit 110 receives the input of the differences between the data plane models before and after the second setting change from the difference extraction unit 109. The influence determination unit 110 stores flows changed by the second setting change. Next, the influence determination unit 110 uses the data plane models before and after the second setting change to make the determination concerning the influence of each of the flows changed by the second setting change on the existing communications.

Figure 27:
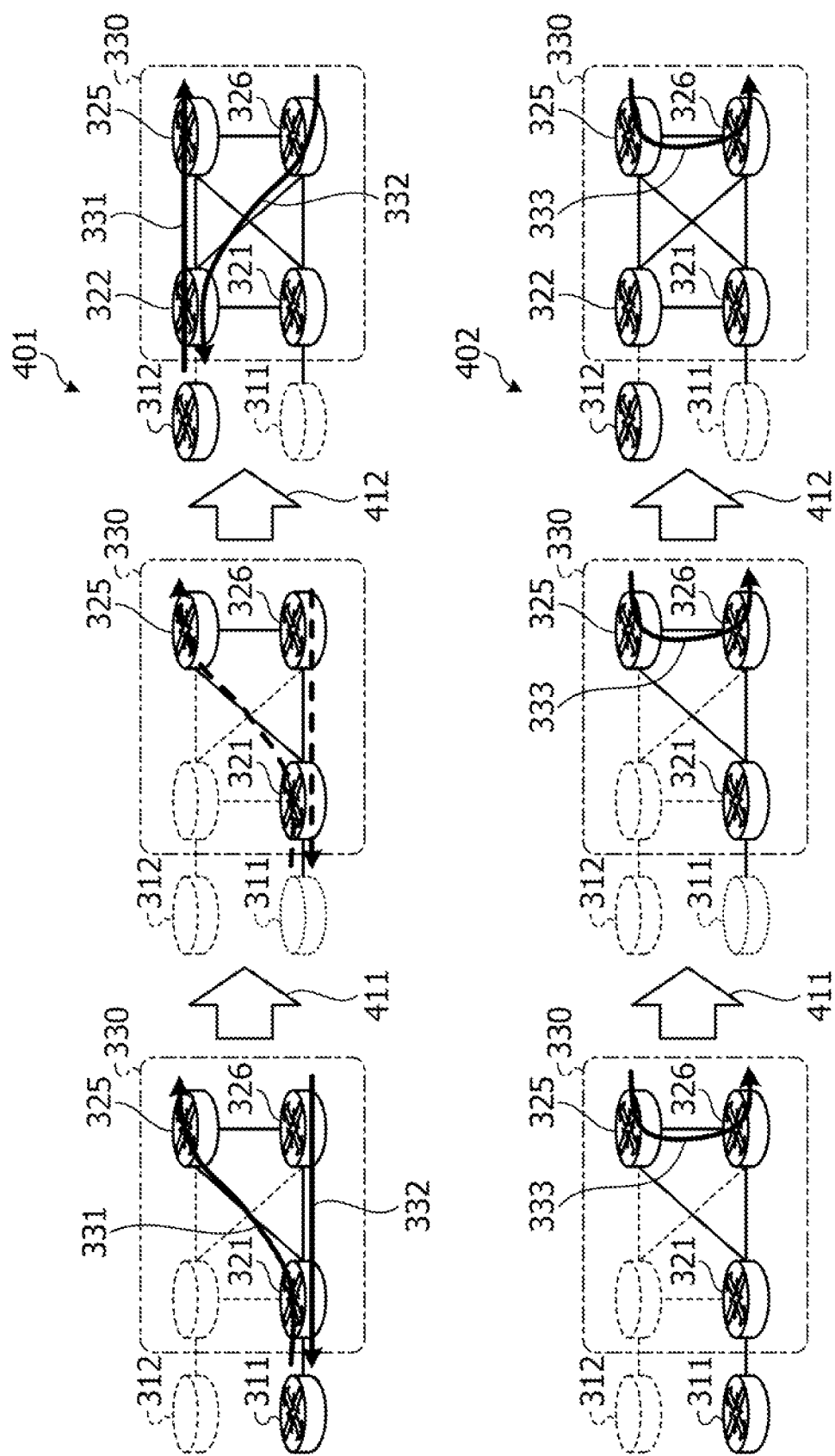
FIG. 27 is a diagram for explaining changes in flows in a case where a capacity change is made.

If the capacity change process is completed, the influence determination unit 110 checks the flows changed by the first setting change and the flows changed by the second setting change against each other. Hereinafter, the changes in the flows in the capacity change will be described with reference to FIG. 27. FIG. 27 is a diagram for explaining changes in flows in the case where a capacity change is made.

In a carrier network 330, for example, there are flows 331 and 332 illustrated in a transition 401. In the transition 401, a setting change 411 represents a first setting change and a setting change 412 represents a second setting change. Before the setting change 411 that is the first setting change, the flow 331 is sent from a carrier coupling router 311 and passes through the carrier network 330 via a customer accommodating router 321 and a network device 325. Before the setting change 411, the flow 332 passes through the carrier network 330 via a network device 326 and a customer accommodating router 321 and reaches the carrier coupling router 311.

When the carrier coupling router 311 is deleted by the setting change 411 that is the first setting change, the reached point of the flows 331 and 332 disappears. After that, when a carrier coupling router 312 is added by the setting change 412 that is the second setting change, the flow 331 is sent from the carrier coupling router 312 and passes through the carrier network 330 via a customer accommodating router 322 and the network device 325. The flow 332 passes through the carrier network 330 via the network device 326 and the customer accommodating router 322 and reaches the carrier coupling router 312.

In this way, the flows 331 and 332 are requested to be changed before and after the two setting changes in this capacity change. Furthermore, all the flows 331 passing through the carrier coupling router 311 before the setting change 411 are requested to pass through the carrier coupling router 312 after the setting change 412.

In the carrier network 330, for example, there is a flow 333 which passes through the network devices 325 and 326 and thereby additionally passes through the carrier network 330 as illustrated in a transition 402. As illustrated in the transition 402, the flow 333 is requested to remain unchanged even when both the setting change 411 and the setting change 412 are made.

Thus, the influence determination unit 110 extracts flows requested to remain unchanged from among the stored flows changed by the first setting change and the stored flows changed by the second setting change. The influence determination unit 110 uses the determination results of the influence on the existing communications to check whether or not each of the flows requested to remain unchanged is changed. As a result, the influence determination unit 110 determines that the unchanged flow does not influence the existing communications. In contrast, the influence determination unit 110 determines that the changed flow influences the existing communications.

The influence determination unit 110 extracts flows requested to be changed from among the stored flows changed by the first setting change and the stored flows changed by the second setting change. The influence determination unit 110 determines whether a condition for a flow change due to the capacity change is met. For example, the influence determination unit 110 determines whether or not all flows passing through the carrier coupling router 311 before the first setting change pass through the carrier coupling router 312 after the second setting change. The influence determination unit 110 determines that the flow meeting the condition for the flow change due to the capacity change is normal. On the other hand, the influence determination unit 110 determines that a failure occurs for the flow not meeting the condition for the flow change due to the capacity change. Thereafter, the influence determination unit 110 outputs the determination results to the output unit 111.

Figure 28:
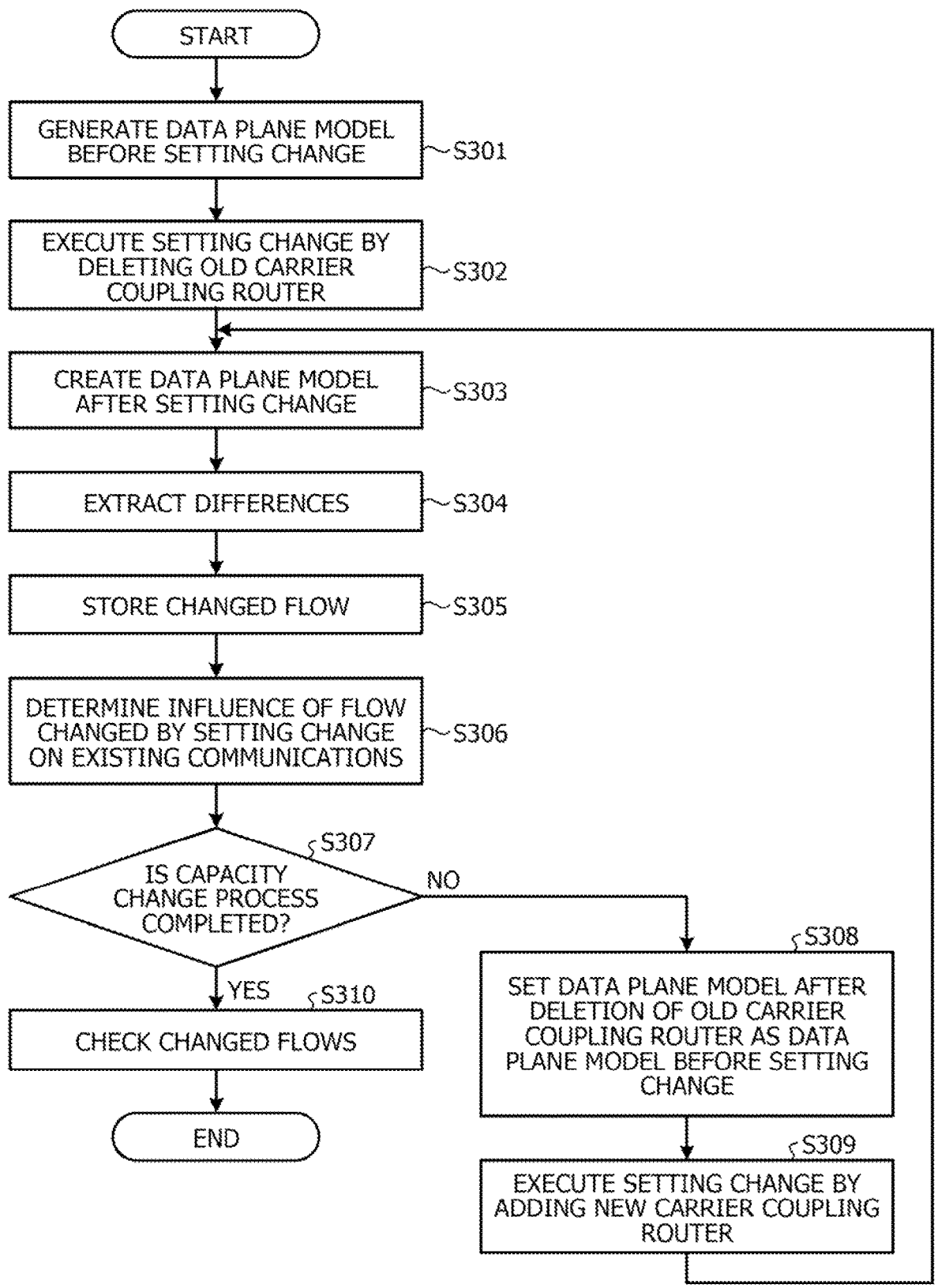
FIG. 28 is a flowchart of a verification process by a network verification apparatus according to Embodiment 2.

Next, a sequence of a verification process by a network verification apparatus 1 according to the present embodiment will be described with reference to FIG. 28. FIG. 28 is a flowchart of a verification process by a network verification apparatus 1 according to Embodiment 2.

The network modeling unit 107 generates a data plane model of the carrier network 300 before a setting change by using the forwarding information and the filtering information of the network devices in the carrier network 300 (step S301).

Next, a setting change of deleting an old carrier coupling router before the setting change is executed according to a setting change procedure (step S302).

Subsequently, the network modeling unit 107 generates a data plane model of the carrier network 300 after the setting change by using the forwarding information and the filtering information of the network devices after the setting change (step S303).

The difference extraction unit 109 acquires the data plane models before and after the setting change from the network modeling unit 107. The difference extraction unit 109 extracts differences between the data plane models before and after the first setting change (step S304).

The influence determination unit 110 receives the input of the differences between the data plane models before and after the setting change from the difference extraction unit 109. The influence determination unit 110 stores flows changed by the setting change (step S305).

Next, using the data plane models before and after the setting change, the influence determination unit 110 makes the determination concerning influence of each of the flows changed by the setting change on the existing communications (step S306).

After that, the influence determination unit 110 determines whether the capacity change process is completed (step S307). If the capacity change process is not completed (step S307: No), the network modeling unit 107 sets the data plane model after the deletion of the old carrier coupling router as the data plane model before the setting change (step S308).

Next, a setting change of adding a new carrier coupling router is executed according to the setting change procedure (step S309). After that, the network verification process returns to step S303.

On the other hand, if the capacity change process is completed (step S307: Yes), the influence determination unit 110 checks the changed flows (step S310). Thus, the influence determination unit 110 makes the determination concerning the influence due to the setting change. Thereafter, the output unit 111 notifies the administrator of the determination results by the influence determination unit 110.

As described above, regarding setting changes to be consecutively made, the network verification apparatus according to the present embodiment uses the data plane model after the immediately previous setting change as the data plane model before the next setting change and performs the network verification for each of the setting changes. The network verification apparatus according to the present embodiment checks the flows changed by the setting changes against each other, and determines whether the setting changes are successful based on whether each flow requested to be changed meets the condition for the flow change. Thus, in a case where the setting changes are consecutively made and the network verification is performed for each setting change, the network verification may be efficiently performed without generating and inputting the existing network for each verification.

Embodiment 3

Next, Embodiment 3 will be described. In some network, there is an address conversion device that performs address conversion such as network address translation (NAT). In such a network, unless the address conversion function is taken into consideration, the continuity of PECs is lost before and after the PECs pass through the address conversion device, and it is difficult to trace the reachability for the PECs. For this reason, it is important to model such a network in consideration of address conversion of each packet in passing through an address conversion device.

In a conceivable method for performing the verification in consideration of the address conversion function, if the destination address of a PEC matches an address targeted by a conversion rule used in the address conversion function, information on the PEC is added as information on the flow after an address conversion by the address conversion device. By using this method, it is possible to verify the reachability even in a network including an address conversion function.

The address conversion function has a purpose to pass only a flow that is sent from an internal network such as an intranet and returns from an external network in some cases. For example, the address conversion function in this case may be said to be a function by which only a flow started in the internal network is allowed to pass when returning from the external network side. The address conversion function has a purpose, for example, to save global addresses by converting private addresses into one global address and sharing the global address, and has also a purpose to hide the internal network from an external network.

For example, in this case, the address conversion function is requested to pass a flow that is transmitted from the internal network and returns from the external network and to block a flow that is started by the external network. However, in the case where the information on the PEC before the address conversion is simply added as the information on the flow after the address conversion, the flow started by the external network may be also determined to have the reachability.

To address this, a network verification apparatus according to the present embodiment performs verification in consideration of communications depending on the purposes of the address conversion function. The network verification apparatus 1 according to the present embodiment is also illustrated in the block diagram of FIG. 1. In the following description, the description of the same functions as the functions of the units in Embodiment 1 will be omitted in some cases.

Figure 29:
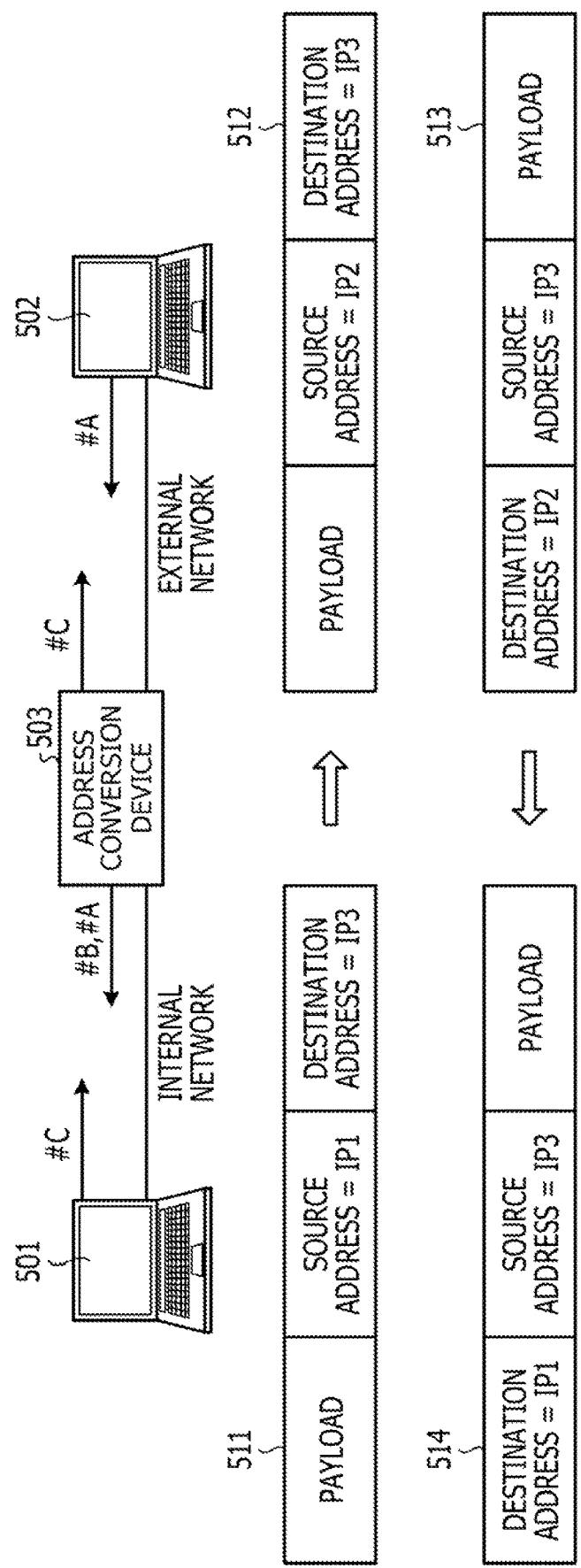
FIG. 29 is a diagram illustrating an example of a network in which an address conversion device is installed.

FIG. 29 is a diagram illustrating an example of a network in which an address conversion device is installed. In this network, a terminal 501 is coupled to an address conversion device 503 via an internal network. The address conversion device 503 and a terminal 502 are coupled to each other via an external network. For example, across the address conversion device 503, a system in which the terminal 501 is installed is a system on the internal network side, and a system in which the terminal 502 is installed is a system on the external network side. The internal network is an example of a "first network" and the external network is an example of a "second network".

The address conversion device 503 is, for example, a NAT device. An operation of the address conversion device 503 will be described below. In the following description, a communication of a packet transmitted by the terminal 501 on the internal network side and a communication of a reply packet to the packet from the terminal 502 on the external network side will be referred to as "a round-trip communication". A communication that is started by either the terminal 501 on the internal network side or the terminal 502 on the external network side and that does not request a reply packet is referred to as "a one-way communication".

In a round-trip communication, the address conversion device 503 receives a packet 511 output from the terminal 501. The packet 511 is a packet for requesting a reply from the terminal 502 at the destination. In accordance with a conversion rule set in advance, the address conversion device 503 converts the source address in the internal network stored in the packet 511 into the source address in the external network. For example, the address conversion device 503 converts IP1, which is the source address in the internal network, into IP2, which is the source address in the external network. The address conversion device 503 transmits a packet 512, in which the source address is converted into IP2, to the terminal 502 having IP3, which is the destination address.

After that, the address conversion device 503 acquires a packet 513, which is a reply to the packet 511 transmitted by the terminal 501, from the terminal 502. In the packet 513, the address specified as the source address in the packet 512 is stored as the destination address. The address conversion device 503 confirms that the packet 513 is the reply to the packet 511. After that, the address conversion device 503 converts the destination address in the external network stored in the packet 513 into the destination address in the internal network. In this case, the destination address in the internal network is the address of the terminal 501. For example, the address conversion device 503 converts IP2, which is the destination address in the external network, into IP1, which is the destination address in the internal network. The address conversion device 503 transmits a packet 514, in which the destination address is converted into IP1, to the terminal 501.

In the case of a one-way communication started by the terminal 501 on the internal network side, the address conversion device 503 receives a packet output from the terminal 501. In the same way as in the case of a round-trip communication, the address conversion device 503 converts the source address in the internal network stored in the packet into the source address in the external network in accordance with the conversion rule. The address conversion device 503 transmits a packet, in which the source address is converted into the source address in the external network, to the terminal 502 at the destination address.

On the other hand, in the case of a one-way communication started by the terminal 502 on the external network side, the address conversion device 503 receives a packet from the terminal 502 on the external network side. In this case, the address conversion device 503 recognizes that the received packet is not a reply to a packet transmitted from the internal network side. The address conversion device 503 discards the received packet. The discarding of the packet may be referred to as a "blackhole".

When constructing the network model, the network modeling unit 107 determines whether the destination address of a PEC representing a flow passing through the address conversion device 503 matches the address specified in the conversion rule of the address conversion device 503. When the destination address of the PEC matches the address specified in the conversion rule, the network modeling unit 107 additionally registers a label of the PEC into a network after the PEC passes through the address conversion device 503. For example, the network modeling unit 107 adds the label of the PEC to the network after the PEC passes through the address conversion device 503 in the data plane model to be generated. The flow passing through the address conversion device 503 is an example of a "passage flow". A flow represented by the PEC before passing through the address conversion device 503 is an example of a "pre-passage flow", and a flow represented by the PEC after passing through the address conversion device 503 is an example of a "post-passage flow". The additionally registered information is an example of "correspondence information".

For example, in the network illustrated in FIG. 29, the network modeling unit 107 attaches a label #C to a PEC representing a flow for passing, through the address conversion device 503, packets sent from the terminal 501 toward the terminal 502. Next, the network modeling unit 107 labels a flow for transmitting packets in which the source address is changed by the address conversion device 503. Since the packets included in the PEC#C and packets transmitted from the address conversion device 503 have the different source addresses but have the same destination address, the network modeling unit 107 treats the flows before and after the change of the source address as the same flow. Thus, the network modeling unit 107 attaches the label #C to the PEC representing the flow after the change of the source address.

In contrast, the network modeling unit 107 labels a flow representing a packet transmission from the terminal 502 on the external network side to the terminal 501 on the internal network side as follows. The network modeling unit 107 attaches a label #A to a PEC from the terminal 502 to the address conversion device 503 in the target flow. The destination address of the target flow is changed by the address conversion device 503. The network modeling unit 107 treats the flow for transmitting the packets in which the destination address is changed by the address conversion device 503 as a flow different from the flow before the change of the destination address. For this reason, the network modeling unit 107 attaches a label #B to a PEC representing the flow after the change of the destination address. In addition, since the destination address of the PEC#A matches the address specified in the conversion rule held in the address conversion device 503, the network modeling unit 107 adds PEC#A to the flow after the change of the destination address. Hereinafter, a PEC label generated in a normal method may be referred to as a primary label, and a PEC label added along with a passage through the address conversion device 503 may be referred to as a secondary label. For example, on the PEC from the address conversion device 503 to the terminal 501 illustrated in FIG. 29, #B is a primary label and #A is a secondary label. Thus, as illustrated in FIG. 29, the labels of the PECs are registered in the data plane model representing the network including the address conversion device 503.

For example, in a case where IP1 is (192.168.0.1), IP2 is (133.160.0.1), and IP3 is (1.0.0.1), the PEC#A and the PEC#B are expressed as in FIG. 30. FIG. 30 is a diagram illustrating an example of PECs before and after passing through the address conversion device. For the PEC#A, both the primary label and the secondary label are expressed in accordance with syntax presented in FIG. 30.

The influence determination unit 110 selects and acquires one determination target flow from the flows changed by the setting change. The influence determination unit 110 makes the determination concerning the influence of the determination target flow on the existing communications. In this determination, the influence determination unit 110 determines the reachability of communication requests for confirming whether or not the determination target flow reaches the destination. In a reachability determination process for the communication requests, the sequence of the determination process differs depending on whether the determination target flow is of a round-trip communication or a one-way communication. Hereinafter, the sequence of the reachability determination process will be described. FIG. 31 is a diagram for explaining the determination of the reachability of communication requests in the cases of a round-trip communication and a one-way communication using NAT.

The influence determination unit 110 acquires the communication requests of the determination target flow. Communication requests 520 presented as an example in FIG. 31 are communication requests in a case where the terminal 501 in FIG. 29 is aEnd and the terminal 502 in FIG. 29 is zEnd. The communication requests 520 include, for example, information on a source address, a destination address, a source port, a destination port, and a protocol.

When the determination target flow is a flow representing a packet transmission from the internal network side to the external network side, the influence determination unit 110 determines whether or not the communication is a round-trip communication based on information given by the administrator and so on. If the communication is not the round-trip communication, the influence determination unit 110 checks the reachability of the communication requests of the determination target flow by tradng the determination target flow by using the communication requests and determining whether or not the determination target flow reaches the destination.

In contrast, if the determination target flow is a flow representing a packet transmission from the internal network side to the external network side and is of the round-trip communication, the influence determination unit 110 executes the following reachability determination process. The influence determination unit 110 sets, as a pair of determination target flows, a combination of the flow representing the packet transmission from the internal network side to the external network side and a flow representing a packet transmission from the external network side to the internal network side, which is a reply thereto. At this time, the influence determination unit 110 sets the reply flag of the determination target flow in the round-trip communication to OFF, which is an initial value.

The influence determination unit 110 determines whether or not the PECs representing the outward flow in the round-trip communication have continuity. If the PECs have no continuity, the outward flow in the round-trip communication does not reach the end point. Thus, the influence determination unit 110 determines that the communication requests of the flows forming the pair for the round-trip communication have no reachability. On the other hand, if the PECs have continuity, the influence determination unit 110 determines whether or not there is a PEC given a secondary label in the PECs having the continuity. Since there is no PEC given the secondary label in the outward flow in the round-trip communication, the influence determination unit 110 determines that there is no PEC given the secondary label. If there is no PEC given the secondary label, the influence determination unit 110 determines whether or not the outward flow in the round-trip communication reaches the end point in the communication requests. If the outward flow in the round-trip communication does not reach the end point in the communication requests, the influence determination unit 110 determines that the communication requests of the flows forming the pair for the round-trip communication have no reachability.

On the other hand, if the outward flow in the round-trip communication reaches the end point in the communication requests, the influence determination unit 110 sets the reply flag of the determination target flow to ON. The influence determination unit 110 sets the communication requests in which the end point in the communication requests of the outward flow in the round-trip communication is changed to the start point as the communication requests of the return flow in the round-trip communication. Next, the influence determination unit 110 determines whether or not the PECs representing the return flow in the round-trip communication have continuity. If the PECs have no continuity, the return flow in the round-trip communication does not reach the end point in the communication requests. Thus, the influence determination unit 110 determines that the communication requests of the flows forming the pair for the round-trip communication have no reachability. On the other hand, if the PECs have the continuity, the influence determination unit 110 determines whether or not there is a PEC given a secondary label in the PECs having the continuity. Since the PEC given the secondary label is present in the return flow in the round-trip communication, the influence determination unit 110 determines that the PEC given the secondary label is present. If the PEC given the secondary label is present, the influence determination unit 110 determines whether the reply flag of the determination target flow is ON or OFF. In the case of the return flow in the round-trip communication, the reply flag is in the ON state. Thus, the influence determination unit 110 determines that the reply flag of the determination target flow is ON. If the reply flag of the determination target flow is ON, the influence determination unit 110 determines whether the return flow in the round-trip communication reaches the end point in the communication requests. If the return flow in the round-trip communication does not reach the end point in the communication requests, the influence determination unit 110 determines that the communication requests of the flows forming the pair for the round-trip communication have no reachability. On the other hand, if the return flow in the round-trip communication reaches the end point in the communication requests, the influence determination unit 110 determines that there is reachability for the flows forming the pair for the round-trip communication. The return flow in the round-trip communication is an example of a "first passage flow". Setting the reply flag to ON is an example of "adding arrival information".

For example, in the case where the communication requests 520 in FIG. 31 are used, a normal determination result for a round-trip communication is a reachability determination result presented in a verification result 521. In the verification result 521, a round-trip communication started by the terminal 501 with the terminal 502 is represented as a route departing from aEnd, passing through zEnd, and returning to aEnd. In this case, the determination target flow reaches zEnd from aEnd through NAT representing the address conversion device 503, and then reaches aEnd through NAT. Therefore, when the determination target flow is normal, the influence determination unit 110 determines that the communication requests 520 have reachability. On the other hand, a round-trip communication started by the terminal 502 with the terminal 501 is represented as a route departing from zEnd, passing through aEnd, and returning to zEnd. In this case, packets in the determination target flow are transmitted from zEnd and discarded by NAT. Therefore, when the determination target flow is normal, the influence determination unit 110 determines that the communication requests 520 have no reachability.

When the determination target flow is a flow representing a packet transmission from the external network side to the internal network side, the influence determination unit 110 sets the reply flag in the determination target flow to the initial value, OFF. Next, the influence determination unit 110 determines whether or not the PECs representing the determination target flow have continuity. If the PECs have no continuity, the influence determination unit 110 determines that there is no reachability for the determination target flow started by the external network. On the other hand, if the PECs have the continuity, the influence determination unit 110 determines whether or not there is a PEC given a secondary label in the PECs having the continuity. Since the PEC given the secondary label is present in the flow started by the external network, the influence determination unit 110 determines that the PEC given the secondary label is present. If the PEC given the secondary label is present, the influence determination unit 110 determines whether the reply flag of the determination target flow started by the external network is ON or OFF. In the case of a flow started by the external network, the reply flag is in the state of OFF, which is the initial value. Thus, the influence determination unit 110 determines that the reply flag of the determination target flow is OFF. If the reply flag of the determination target flow is OFF, the influence determination unit 110 determines that there is no reachability for the determination target flow started by the external network. On the other hand, if the flow reaches the end point in the communication requests, the influence determination unit 110 determines that there is reachability for the determination target flow started by the external network. The flow that is started on the external network side and is transmitted from the external network side to the internal network side is an example of a "second passage flow".

For example, in the case where the communication requests 520 in FIG. 31 are used, a normal determination result for a one-way communication is a reachability determination result presented in a verification result 522. In the verification result 522, a one-way communication started by the terminal 501 with the terminal 502 is represented as a route departing from aEnd and reaching zEnd. In this case, the determination target flow reaches zEnd from aEnd through NAT. Therefore, when the determination target flow is normal, the influence determination unit 110 determines that the communication requests 520 have reachability. On the other hand, a one-way communication started by the terminal 502 with the terminal 501 is represented as a route departing from zEnd and reaching aEnd. In this case, packets in the determination target flow are transmitted from zEnd and discarded by NAT. Therefore, when the determination target flow is normal, the influence determination unit 110 determines that the communication requests 520 have no reachability.

After the determination of the reachability for the determination target flow is completed, the influence determination unit 110 makes the determination concerning the influence of the determination target flow on the existing communications by using the determination result of the reachability as described above. For all the flows on the data plane model, the influence determination unit 110 makes the determination of the reachability and the determination concerning the influence on the existing communications using the determination results of the reachability.

Figure 32:
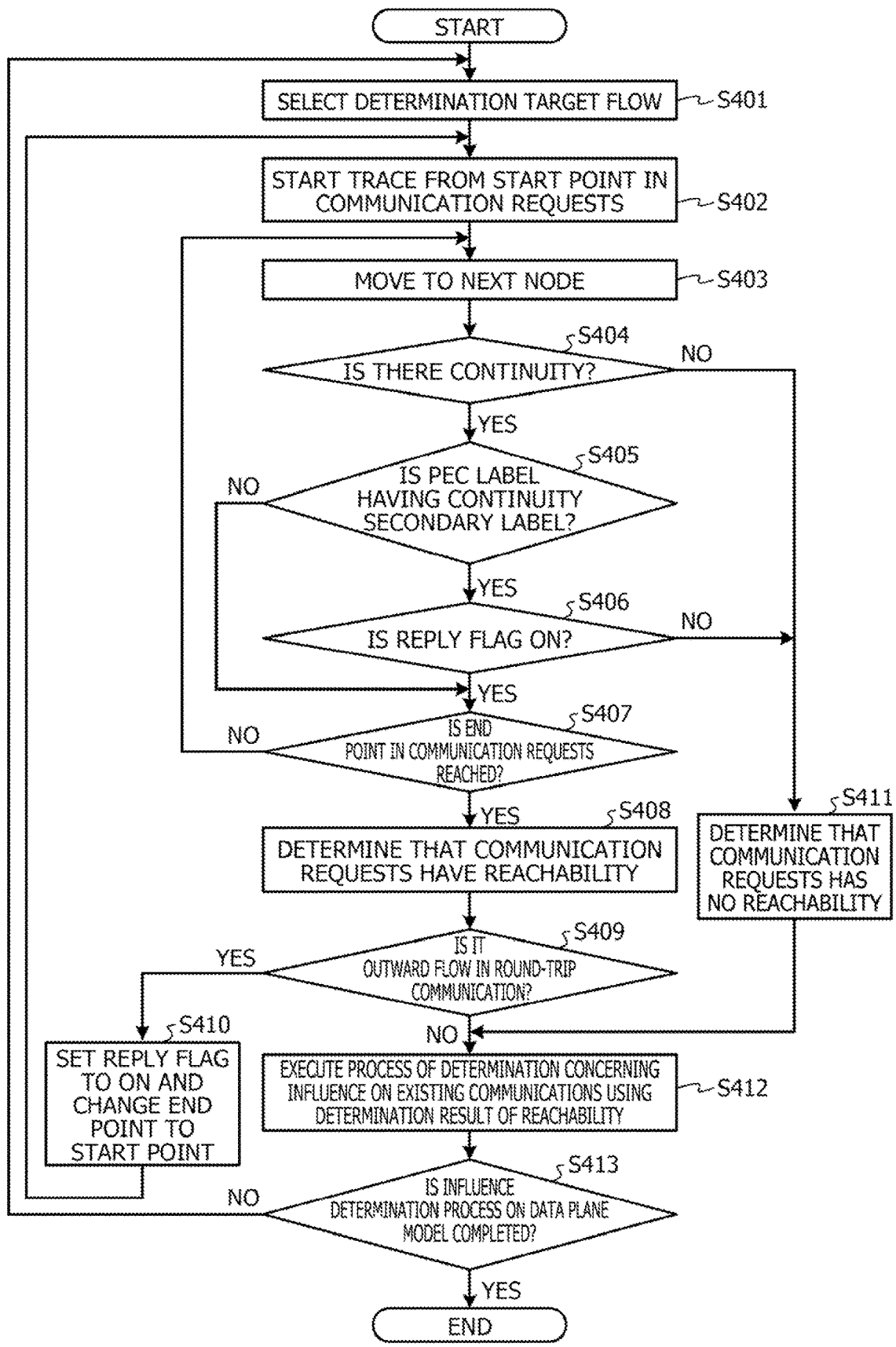
FIG. 32 is a flowchart of an influence determination process including reachability determination for communication requests by an influence determination unit according to Embodiment 3.

Next, with reference to FIG. 32, a description will be given of a sequence of an influence determination process including the determination of the reachability of the communication requests by an influence determination unit 110 according to the present embodiment. FIG. 32 is a flowchart of the influence determination process including the reachability determination for the communication requests by an influence determination unit according to Embodiment 3.

The influence determination unit 110 selects a determination target flow from flows on the data plane model (step S401). The influence determination unit 110 acquires the communication requests of the determination target flow.

Next, the influence determination unit 110 starts tracing the determination target flow from the start point in the communication requests (step S402).

Subsequently, the influence determination unit 110 moves to the next node on the data plane model along the route labeled with the PEC representing the determination target flow (step S403).

Next, the influence determination unit 110 determines whether or not the determination target flow has continuity depending on whether or not the PECs having the same label exist before and after the node to which the influence determination unit 110 moves (step S404).

If the flow has the continuity (step S404: Yes), the influence determination unit 110 determines whether or not the PEC label having the continuity is the secondary label (step S405). If the PEC label having the continuity is the primary label (step S405: No), the influence determination unit 110 proceeds to step S407.

On the other hand, if the PEC label having the continuity is the secondary label (step S405: Yes), the influence determination unit 110 determines whether or not the reply flag of the determination target flow is ON (step S406).

If the determination flag is ON (step S406: Yes), the influence determination unit 110 determines whether the trace position reaches the end point in the communication requests (step S407). If the trace position does not reach the end point in the communication requests (step S407: No), the influence determination unit 110 returns to step S403.

On the other hand, if the trace position reaches the end point in the communication requests (step S407: Yes), the influence determination unit 110 determines that the communication requests of the determination target flow have reachability (step S408).

Thereafter, the influence determination unit 110 determines whether or not the determination target flow is the outward flow in the round-trip communication (step S409).

If the determination target flow is the outward flow in the round-trip communication (step S409: Yes), the influence determination unit 110 sets the return flow in the round-trip communication as the determination target flow. The influence determination unit 110 sets the reply flag of the determination target flow to ON, and sets the communication requests of the return flow in the round-trip communication by changing the end point in the communication requests of the outward flow in the round-trip communication to the start point (step S410). Thereafter, the influence determination unit 110 returns to step S402. On the other hand, if the determination target flow is not the outward flow in the round-trip communication (step S409: No), the influence determination unit 110 proceeds to step S412.

Meanwhile, if the determination target flow has no continuity (step S404: No) or if the reply flag is OFF (step S406: No), the influence determination unit 110 determines that the communication requests of the determination target flow have no reachability (step S411). Thereafter, the influence determination unit 110 proceeds to step S412.

Next, the influence determination unit 110 executes the process of the determination concerning the influence of the determination target flow on the existing communications by using the determination result of the reachability (step S412).

After that, the influence determination unit 110 determines whether or not the influence determination process on the data plane model is completed depending on whether or not the influence determination process is completed for all the flows for which the settings are changed in the data plane model (step S413). If the influence determination process on the data plane model is not completed (step S413: No), the influence determination unit 110 returns to step S401. On the other hand, if the influence determination process on the data plane model is completed (step S413: Yes), the influence determination unit 110 ends the current influence determination process.

As described above, the network verification apparatus according to the present embodiment treats a flow from the external network side to the internal network side through the address conversion device in the manner different depending on the start position of the flow. For example, the network verification apparatus distinguishes between a flow from the external network side to the internal network side in a round-trip communication started by the internal network side and a flow from the external network side to the internal network side started by the external network side. In the case of flows in a round-trip communication started by the internal network side, the network verification apparatus treats the flow for requesting a reply and the flow for transmitting the requested reply as a series of the flows, and allows the flow for transmitting the reply to pass through the address conversion device. On the other hand, in the case of a flow that is started by the external network side and directed to the internal network side, the network verification apparatus treats the flow as a flow whose packets are discarded by the address conversion device. Thus, in verification of a communication using the address conversion device, it is possible to accurately determine whether or not to pass a flow transmitted from the external network side to the Internal network side, and to efficiently perform the network verification.

Modification Example

In Embodiment 3, the network verification method in the case where the address conversion device exists on the network has been described. Even in a case where a firewall SPI exists on the network, the network verification may be performed in the same method. Hereinafter, verification on a network in which a firewall SPI is installed will be described.

Figure 33:
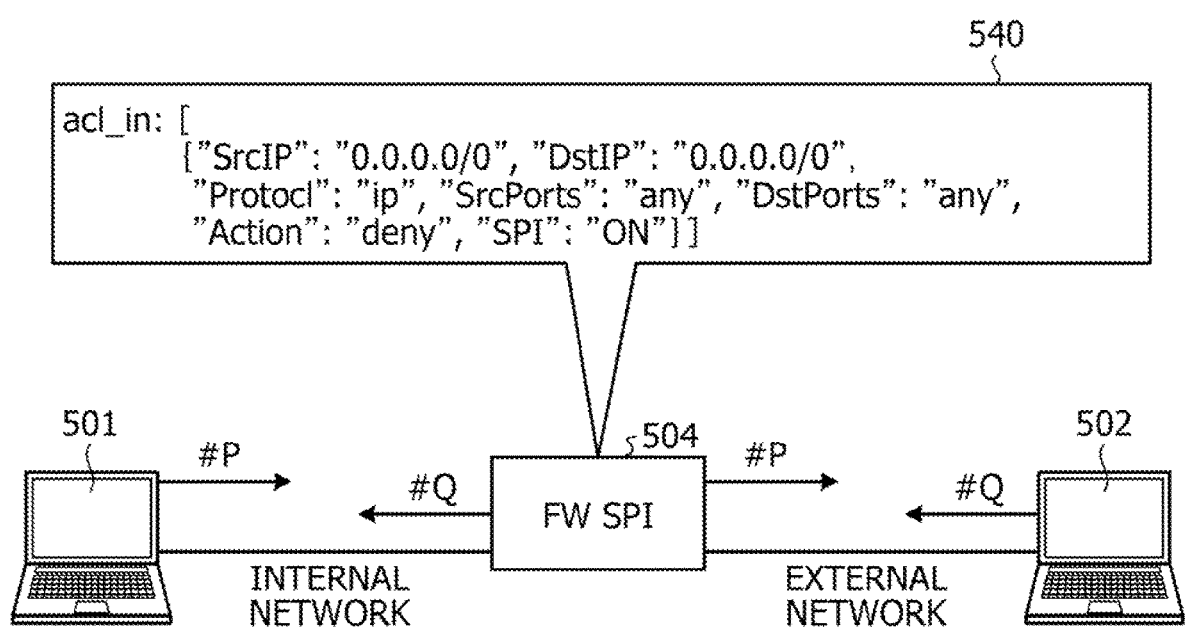
FIG. 33 is a diagram illustrating an example of a network in which a firewall stateful packet inspection (SPI) is installed.

FIG. 33 is a diagram illustrating an example of a network in which a firewall SPI is installed. In FIG. 33, the firewall SPI is denoted by "FW SPI". For example, in this network, a terminal 501 is coupled to a firewall SPI 504 via an internal network as illustrated in FIG. 33. The firewall SPI 504 and a terminal 502 are coupled to each other via an external network. For example, across the firewall SPI 504, a system in which the terminal 501 is installed is a system on the internal network side, and a system in which the terminal 502 is installed is a system on the external network side.

The firewall SPI 504 dynamically opens and closes a port by checking contents of packets trying to pass through the firewall. The firewall SPI 504 temporarily stores data transmitted from the internal network side as a session log, and opens the port when a packet arriving from the external network side Is consistent with the session log or closes the port when the packet is inconsistent with the session log.

For example, the firewall SPI 504 receives a packet output from the terminal 501 in a round-trip communication. This packet is a packet for requesting a reply from the terminal 502 at a destination. The firewall SPI 504 transmits the received packet to the terminal 502 and holds the transmitted data as a session log.

After that, the firewall SPI 504 receives a packet transmitted by the terminal 502 to the terminal 501. The firewall SPI 504 compares the received packet with the held session log to confirm that the received packet is consistent in terms of packet transmission/reception. After that, the firewall SPI 504 transmits the packet received from the terminal 502 to the terminal 501.

In the case of a one-way communication started by the terminal 501 on the internal network side, the firewall SPI 504 receives a packet output from the terminal 501. The firewall SPI 504 transmits the received packet to the terminal 502 as in the case of a round-trip communication.

On the other hand, in the case of a one-way communication started by the terminal 502 on the external network side, the firewall SPI 504 receives a packet from the terminal 502 on the external network side. In this case, the firewall SPI 504 compares the held session log with the received packet to confirm that the received packet is inconsistent in terms of packet transmission/reception. When not holding any session log, the firewall SPI 504 also confirms that the received packet is inconsistent. The firewall SPI 504 closes the port and refuses the passage of the received packet. This refusal of the passage of the packet may be referred to as "block". The firewall SPI 504 is an example of a "second passage flow blocking device".

The network modeling unit 107 generates an ACL 540 representing the FW SPI. The ACL 540 is set to block all flows from the external network. Therefore, the network modeling unit 107 adds an SPI parameter to the ACL 540 representing the firewall SPI 504 in order to allow a flow returning from the external network in the round-trip communication to pass through. When the SPI parameter is ON, a flow from the external network is allowed to pass through the firewall SPI 504. On the other hand, when the SPI parameter is OFF, a flow from the external network is blocked by the firewall SPI 504. The network modeling unit 107 sets the SPI parameter in the ACL 540 of the firewall SPI 504 to ON. On the other hand, for a firewall not having the SPI function, the network modeling unit 107 sets the SPI parameter in the ACL to OFF.

Among PECs passing through the firewall SPI 504, the network modeling unit 107 registers the PECs having the same label before and after passing through the firewall SPI 504 in a communication from the internal network side to the external network side. For example, as illustrated in FIG. 33, PEC#P representing a communication from the internal network side to the external network side is registered before and after the firewall SPI 504.

Similarly, among the PECs passing through the firewall SPI 504, the network modeling unit 107 registers the PECs having the same label before and after passing through the firewall SPI 504 in a communication from the external network side to the internal network side. For example, as illustrated in FIG. 33, PEC#Q representing a communication from the external network side to the internal network side is registered before and after the firewall SPI 504.

The influence determination unit 110 selects and acquires one determination target flow. Next, the influence determination unit 110 acquires the communication requests of the determination target flow. The communication requests 541 presented as an example in FIG. 34 are communication requests in the case where the terminal 501 in FIG. 33 is aEnd and the terminal 502 in FIG. 33 is zEnd.

When the determination target flow is a flow representing a packet transmission from the internal network side to the external network side, the influence determination unit 110 determines whether or not the communication is a round-trip communication based on information given by the administrator and so on. If the communication is not the round-trip communication, the influence determination unit 110 checks the reachability of the communication requests of the determination target flow by tracing the determination target flow by using the communication requests and determining whether or not the determination target flow reaches the destination.

In contrast, if the determination target flow is a flow representing a packet transmission from the internal network side to the external network side and is of the round-trip communication, the influence determination unit 110 executes the following reachability determination process. The influence determination unit 110 sets, as a pair of determination target flows, a combination of the flow representing the packet transmission from the internal network side to the external network side and a flow representing a packet transmission from the external network side to the internal network side, which is a reply thereto. At this time, the influence determination unit 110 sets the reply flag of the determination target flow in the round-trip communication to the initial value, OFF.

The influence determination unit 110 determines whether or not a PEC representing the outward flow in the round-trip communication is accepted by the ACL 540 representing the firewall SPI 504. Since all flows from the internal network are allowed to pass through the firewall SPI 504, the PEC representing the outward flow in the round-trip communication is accepted by the ACL 540. Then, the influence determination unit 110 checks whether or not the outward flow in the round-trip communication reaches the end point. If the outward flow in the round-trip communication reaches the end point in the communication requests, the influence determination unit 110 sets the reply flag of the determination target flow to ON. The influence determination unit 110 sets the communication requests in which the end point in the communication requests of the outward flow in the round-trip communication is changed to the start point as the communication requests of the return flow in the round-trip communication.

Next, the influence determination unit 110 determines whether or not the PEC representing the return flow in the round-trip communication is accepted by the ACL 540 representing the firewall SPI 504. In this case, since all flows from the external network are blocked by the ACL 540, the influence determination unit 110 determines that the PEC representing the return flow in the round-trip communication is blocked by the ACL 540. Next, the influence determination unit 110 determines whether or not the SPI parameter in the blocking ACL 540 is ON. Since the ACL 540 represents the firewall SPI 504, the influence determination unit 110 determines that the SPI parameter in the ACL 540 is ON. When the SPI parameter is ON, the influence determination unit 110 determines whether the reply flag of the determination target flow is ON or OFF. In the case of the return flow in the round-trip communication, the reply flag is in the ON state. Thus, the influence determination unit 110 determines that the reply flag of the determination target flow is ON. When the reply flag of the determination target flow is ON, the influence determination unit 110 checks whether or not the return flow in the round-trip communication reaches the end point in the communication requests. If the return flow in the round-trip communication reaches the end point in the communication requests, the influence determination unit 110 determines that there is reachability for the flows forming the pair for the round-trip communication.

For example, in the case where the communication requests 541 in FIG. 34 are used, a normal determination result for a round-trip communication is a reachability determination result presented in a verification result 542. In FIG. 34, the firewall SPI 504 is denoted by "FW". In the verification result 542, a round-trip communication started by the terminal 501 with the terminal 502 is represented as a route departing from aEnd, passing through zEnd, and returning to aEnd. In this case, the determination target flow reaches zEnd from aEnd through the firewall SPI 504, and then reaches aEnd through the firewall SPI 504. Therefore, if the determination target flow is normal, it is determined that the communication requests 541 have reachability. On the other hand, a round-trip communication started by the terminal 502 with the terminal 501 is represented as a route departing from zEnd, passing through aEnd, and returning to zEnd. In this case, packets in the determination target flow are transmitted from zEnd and blocked by the firewall SPI 504. Therefore, if the determination target flow is normal, it is determined that the communication requests 541 have no reachability.

When the determination target flow is a flow representing a packet transmission from the external network side to the internal network side, the influence determination unit 110 sets the reply flag in the determination target flow to the initial value, OFF. Next, the influence determination unit 110 determines whether the PEC representing the determination target flow is accepted by the ACL 540 representing the firewall SPI 504. When the PEC is blocked by the ACL 540, the influence determination unit 110 determines whether or not the SPI parameter in the ACL 540 is ON. In this case, the influence determination unit 110 determines that the SPI parameter in the ACL 540 is ON. When the SPI parameter is ON, the influence determination unit 110 determines whether the reply flag of the determination target flow is ON or OFF. In the case of a one-way communication from the external network side to the internal network side, the reply flag is in the OFF state. Thus, the influence determination unit 110 determines that the reply flag of the determination target flow is OFF. If the reply flag of the determination target flow is OFF, the influence determination unit 110 determines that there is no reachability for the determination target flow started by the external network.

For example, in a case where the communication requests 541 in FIG. 34 are used, a normal determination result for a one-way communication is a reachability determination result presented in a verification result 543. In the verification result 543, a one-way communication started by the terminal 501 with the terminal 502 is represented as a route departing from aEnd and reaching zEnd. In this case, the determination target flow reaches zEnd from aEnd through the firewall SPI 504. Therefore, if the determination target flow is normal, it is determined that the communication requests 541 have reachability. On the other hand, a one-way communication started by the terminal 502 with the terminal 501 is represented as a route departing from zEnd and reaching aEnd. In this case, packets in the determination target flow are transmitted from zEnd and blocked by the firewall SPI 504. Therefore, if the determination target flow is normal, it is determined that the communication requests 541 have no reachability.

After the determination of the reachability for the determination target flow is completed, the influence determination unit 110 makes the determination concerning the influence of the determination target flow on the existing communications by using the determination result of the reachability as described above. For all the flows on the data plane model, the influence determination unit 110 makes the determination of the reachability and the determination concerning the influence on the existing communications using the determination results of the reachability.

Figure 35:
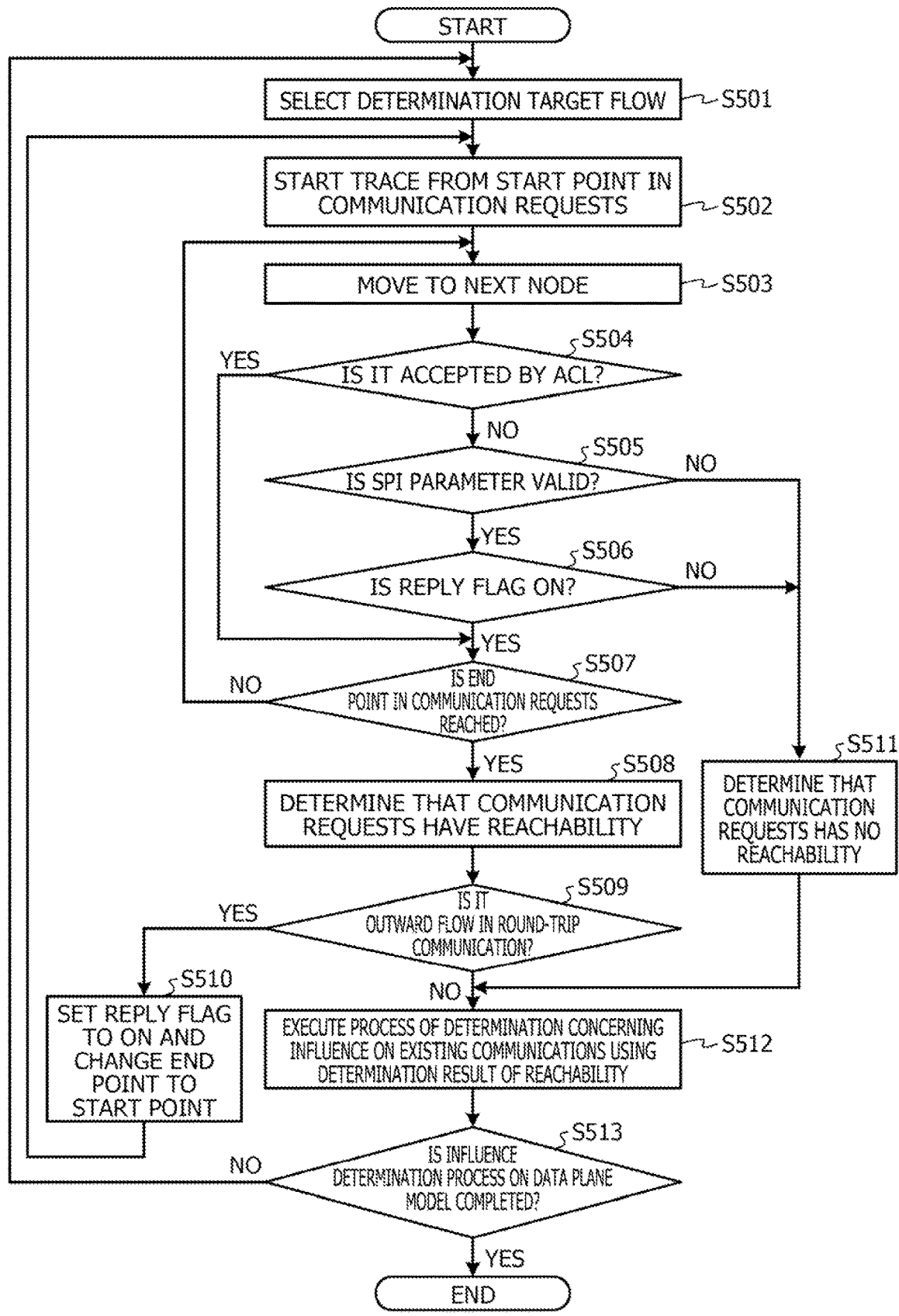
FIG. 35 is a flowchart of an influence determination process including reachability determination for communication requests by an influence determination unit according to Modification Example of Embodiment 3.

Next, with reference to FIG. 35, a description will be given of a sequence of an influence determination process including the reachability determination for the communication requests by the influence determination unit 110 according to the present modification example. FIG. 35 is a flowchart of an influence determination process including the reachability determination for the communication requests by the influence determination unit according to Modification Example of Embodiment 3.

The influence determination unit 110 selects a determination target flow from flows on the data plane model (step S501). The influence determination unit 110 acquires the communication requests of the determination target flow.

Next, the influence determination unit 110 starts tracing the determination target flow from the start point in the communication requests (step S502).

Subsequently, the influence determination unit 110 moves to the next node on the data plane model along a route labeled with the PEC representing the determination target flow (step S503).

Next, the influence determination unit 110 determines whether the PEC representing the determination target flow is accepted by the ACL of the node to which the influence determination unit 110 moves (step S504). If the PEC representing the determination target flow is accepted by the ACL (step S504: Yes), the influence determination unit 110 proceeds to step S507.

On the other hand, if the PEC representing the determination target flow is blocked by the ACL (step S504: No), the influence determination unit 110 determines whether or not the SPI parameter in the ACL is valid (step S505).

If the SPI parameter is valid (step S505: Yes), the influence determination unit 110 determines whether or not the reply flag of the determination target flow is ON (step S506).

If the PEC representing the determination target flow is accepted by the ACL (step S504: Yes) or if the reply flag is ON (step S506: Yes), the influence determination unit 110 determines whether the trace position reaches the end point in the communication requests (step S507). If the trace position does not reach the end point in the communication requests (step S507: No), the influence determination unit 110 returns to step S503.

On the other hand, if the trace position reaches the end point in the communication requests (step S507: Yes), the influence determination unit 110 determines that the communication requests of the determination target flow have reachability (step S508).

Thereafter, the influence determination unit 110 determines whether or not the determination target flow is the outward flow in the round-trip communication (step S509).

If the determination target flow is the outward flow in the round-trip communication (step S509: Yes), the influence determination unit 110 sets the return flow in the round-trip communication as the determination target flow. The influence determination unit 110 sets the reply flag of the determination target flow to ON, and sets the communication requests of the return flow in the round-trip communication in which the end point in the communication requests of the outward flow in the round-trip communication is changed to the start point (step S510). Thereafter, the influence determination unit 110 returns to step S502. Meanwhile, if the determination target flow is not the outward flow in the round-trip communication (step S509: No), the influence determination unit 110 proceeds to step S512.

On the other hand, if the SPI parameter is invalid (step S505: No) or if the reply flag of the determination target flow is OFF (step S506: No), the influence determination unit 110 determines that the communication requests of the determination target flow have no reachability (step S511). Thereafter, the influence determination unit 110 proceeds to step S512.

Next, the influence determination unit 110 executes the process of the determination concerning the influence of the determination target flow on the existing communications by using the determination result of the reachability (step S512).

After that, the influence determination unit 110 determines whether or not the influence determination process on the data plane model is completed depending on whether or not the influence determination process is completed for all the flows for which the settings are changed in the data plane model (step S513). If the influence determination process on the data plane model is not completed (step S513: No), the influence determination unit 110 returns to step S501. On the other hand, if the influence determination process on the data plane model is completed (step S513: Yes), the influence determination unit 110 ends the current influence determination process.

As described above, the network verification apparatus according to the present modification example treats a flow from the external network side toward the internal network side through the firewall SPI in the manner different depending on the start position. For example, the network verification apparatus distinguishes between a flow from the external network side to the internal network side in a round-trip communication started by the internal network side and a flow from the external network side to the internal network side started by the external network side. In the case of flows in a round-trip communication started by the internal network side, the network verification apparatus treats the flow for requesting a reply and the flow for transmitting the requested reply as a series of the flows, and allows the flow for transmitting the reply to pass through the firewall SPI. On the other hand, in the case of a flow that is started by the external network side and directed to the internal network side, the network verification apparatus treats the flow as a flow blocked by the firewall SPI. Thus, in the verification of a communication using the firewall SPI, it is possible to accurately determine whether or not to pass a flow directed from the external network side to the internal network side, and to efficiently perform the network verification.

(Hardware Configuration)

Figure 36:
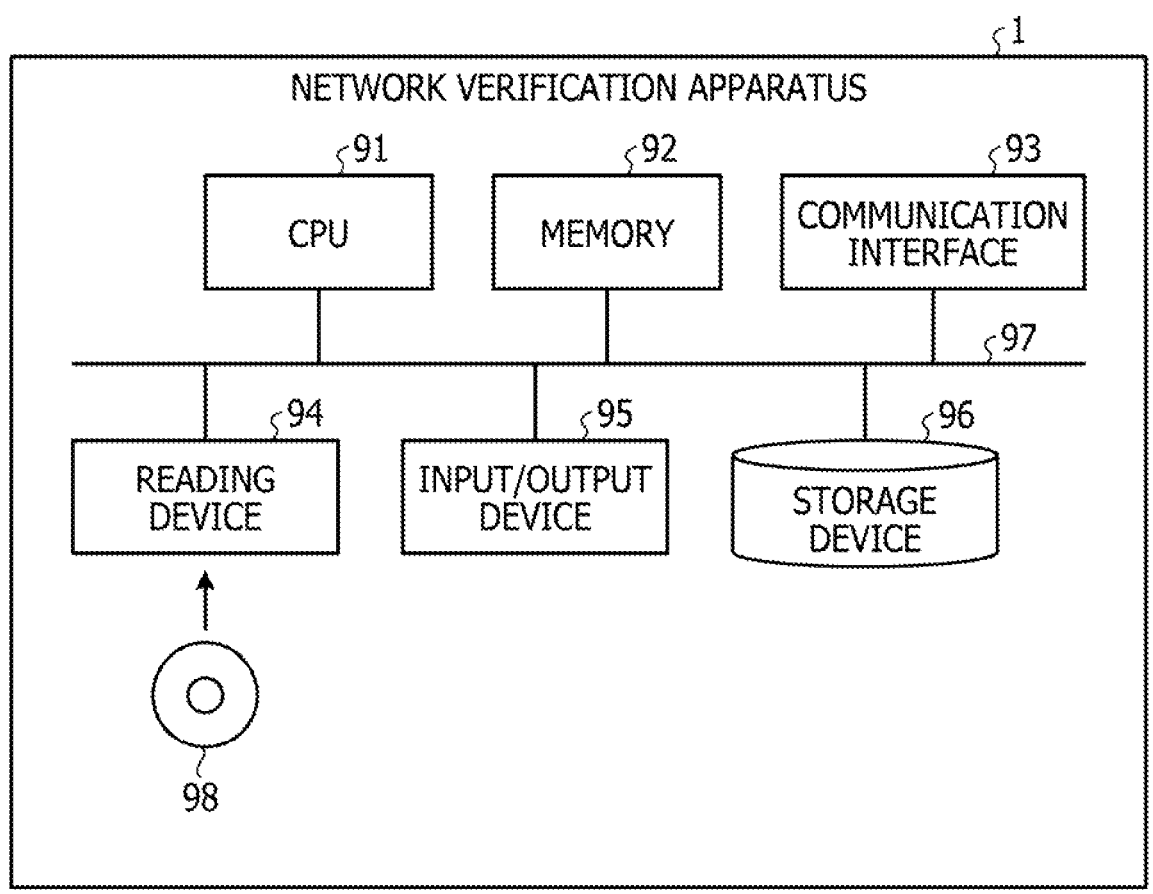
FIG. 36 is a hardware configuration diagram of a network verification apparatus.

FIG. 36 is a hardware configuration diagram of a network verification apparatus. For example, the network verification apparatus 1 includes, for example, a central processing unit (CPU) 91, a memory 92, a communication interface 93, a reading device 94, an input/output device 95, and a storage device 96. The CPU 91 is coupled to the memory 92, the communication interface 93, the reading device 94, the input/output device 95, and the storage device 96 via a bus 97.

The communication interface 93 implements the function of the communication control unit 102 illustrated in FIG. 1. The input/output device 95 implements the function of the setting change procedure input unit 101 illustrated in FIG. 1. The reading device 94 is a compact disk (CD) drive, a Digital Versatile Disc (DVD) drive, or the like. The reading device 94 writes and reads data to and from an external storage medium 98 such as a CD or a DVD.

The storage device 96 is a large-capacity storage device such as a hard disk, a solid-state drive (SSD), or the like. The storage device 96 stores various programs. For example, the storage device 96 stores programs for implementing the functions of the setting change procedure input unit 101, the communication control unit 102, the post-setting change table estimation unit 103, the post-setting change configuration generation unit 104, the configuration information collection unit 105, and the table information collection unit 106 illustrated in FIG. 1. The storage device 96 stores programs for implementing the functions of the network modeling unit 107, the ACL extraction unit 108, the difference extraction unit 109, the influence determination unit 110, and the output unit 111 illustrated in FIG. 1.

The CPU 91 reads various programs stored in the storage device 96, loads the programs to the memory 92, and executes the programs. In this way, the CPU 91 implements the functions of the setting change procedure input unit 101, the communication control unit 102, the post-setting change table estimation unit 103, the post-setting change configuration generation unit 104, the configuration information collection unit 105, and the table information collection unit 106 illustrated in FIG. 1. The CPU 91 implements the functions of the network modeling unit 107, the ACL extraction unit 108, the difference extraction unit 109, the influence determination unit 110, and the output unit 111 illustrated in FIG. 1.

The configuration in which the programs for implementing the functions of the units illustrated in FIG. 1 are stored in the storage device 96 and are loaded and executed by the CPU 91 has been described above. Instead, another configuration may be employed. For example, the functions of the units may be implemented in such a way that these programs are stored in the external storage medium 98, and then the programs read from the external storage medium 98 by the reading device 94 are executed by the CPU 91.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication coupling verification method executed by a computer, the communication coupling verification method comprising:
identifying both setting information before a setting change of each of network devices arranged in a network and forwarding information before the setting change;

identifying both setting information after the setting change and the forwarding information after the setting change;

generating a first model and a second model, wherein the first model is a model corresponding to the network before the setting change and that is generated by using the setting information before the setting change and the forwarding information before the setting change, and the second model is a model that corresponds to the network after the setting change and that is generated by using the setting information after the setting change and the forwarding information after the setting change;

obtaining a difference between the generated first model and the generated second model, the obtaining of the difference including obtaining as the difference a first set of packets obtained by removing, from a set of packets extracted from the generated second model, duplicate packets overlapping between the first model and the second model; and determining, for each packet of the first set of packets obtained as the difference, influence of the setting change on the network by using a reached point of that packet, wherein the reached point of that packet is obtained by tracing that packet in the first model corresponding to the network before the setting change, wherein the determining for each packet includes:

determining whether the reached point of the each packet includes a destination designated in the each packet, and in response to the determining that the reached point of the each packet does not include the destination designated in the each packet, outputting a determination result indicating that the each packet does not influence the network before the setting change.

2. The communication coupling verification method according to claim 1, further comprising:

acquiring the setting information before the setting change of each of the network devices;

acquiring a setting change procedure including setting change information for each of the network devices; and generating the setting information after the setting change based on the setting information before the setting change and the setting change procedure.

3. The communication coupling verification method according to claim 1, further comprising:

obtaining the forwarding information after the setting change by executing simulation using the setting information after the setting change.

4. The communication coupling verification method according to claim 1, further comprising:

generating flows each of which is a set of packets to be handled in the same manner to be allowed to pass or blocked by each of the network devices, wherein the first model and the second model are generated based on whether or not each of the generated flows passes through each of the network devices.

5. The communication coupling verification method according to claim 4, further comprising extracting each of the flows which is changed by the setting change based on the difference and determining the influence on the network based on behaviors of the extracted flow in the first model and the second model.

6. The communication coupling verification method according to claim 5, wherein the influence on the network is determined based on whether the flow changed by the setting change includes an existing communication.

7. The communication coupling verification method according to claim 1, wherein when a first setting change and a second setting change are consecutively performed, the first model before the first setting change and the second model after the first setting change are generated, a first difference between the first model before the first setting change and the second model after the first setting change is obtained, the second model after the first setting change is set as the first model before the second setting change, the second model after the second setting change is generated, a second difference between the first model before the second setting change and the second model after the second setting change is obtained, and influence of the first setting change and the second setting change on the network is determined based on the first difference and the second difference.

8. The communication coupling verification method according to claim 5, wherein each of the network devices includes a passage management device that couples a first network and a second network included in the network to each other and that has a function of allowing a communication from the second network to the first network to pass through the passage management device when the communication meets a predetermined condition, and the method comprises determining whether or not to allow each passage flow from the second network to the first network among the extracted flows to pass through the passage management device by distinguishing whether the passage flow is a first passage flow as a reply to a request transmitted from the first network or a second passage flow other than the reply.

9. The communication coupling verification method according to claim 8, further comprising:

verifying reachability for the flow responding to the request from a source device in the first network to a destination device in the second network; and when the reachability is recognized, adding arrival information to the first passage flow, and verifying reachability for the first passage flow from the destination device to the source device.

10. The communication coupling verification method according to claim 9, wherein the passage management device is an address conversion device, and correspondence information for recognizing a post-passage flow in the passage flow to be the same flow as a pre-passage flow in the passage flow is added to the post-passage flow, the pre-passage flow being a flow before passing through the address conversion device, the post-passage flow being a flow after passing through the address conversion device, and it is determined that the first passage flow in which the correspondence information is added to the post-passage flow and to which the arrival information is added is allowed to pass through the address conversion device.

11. The communication coupling verification method according to claim 9, wherein the passage management device is a second passage flow blocking device that blocks the second passage flow, and when the passage flow is blocked by the network device, the network device that blocks the passage flow is the second passage flow blocking device and determines that the first passage flow to which the arrival information is added is allowed to pass.

12. A non-transitory computer-readable storage medium storing a program that causes a computer to execute a process, the process comprising:

identifying both setting information before a setting change of each of network devices arranged in a network and forwarding information before the setting change;

identifying both setting information after the setting change and the forwarding information after the setting change;

generating a first model and a second model, wherein the first model is a model corresponding to the network before the setting change and that is generated by using the setting information before the setting change and the forwarding information before the setting change, and the second model is a model that corresponds to the network after the setting change and that is generated by using the setting information after the setting change and the forwarding information after the setting change;

obtaining a difference between the generated first model and the generated second model, the obtaining of the difference including obtaining as the difference a first set of packets obtained by removing, from a set of packets extracted from the generated second model, duplicate packets overlapping between the first model and the second model; and determining, for each packet of the first set of packets obtained as the difference, influence of the setting change on the network by using a reached point of that packet, wherein the reached point of that packet is obtained by tracing that packet in the first model corresponding to the network before the setting change, wherein the determining for each packet includes:

determining whether the reached point of the each packet includes a destination designated in the each packet, and in response to the determining that the reached point of the each packet does not include the destination designated in the each packet, outputting a determination result indicating that the each packet does not influence the network before the setting change.

13. A network verification apparatus, comprising:

a memory; and a processor coupled to the memory and the processor configured to:

identify both setting information before a setting change of each of network devices arranged in a network and forwarding information before the setting change, identify both setting information after the setting change and the forwarding information after the setting change, generate a first model and a second model, wherein the first model is a model corresponding to the network before the setting change and that is generated by using the setting information before the setting change and the forwarding information before the setting change, and the second model is a model that corresponds to the network after the setting change and that is generated by using the setting information after the setting change and the forwarding information after the setting change, obtain a difference between the generated first model and the generated second model, the obtaining of the difference including obtaining as the difference a first set of packets obtained by removing, from a set of packets extracted from the generated second model, duplicate packets overlapping between the first model and the second model, and determine, for each packet of the first set of packets obtained as the difference, influence of the setting change on the network by using a reached point of that packet, wherein the reached point of that packet is obtained by tracing that packet in the first model corresponding to the network before the setting change, wherein the determining for each packet includes:

determining whether the reached point of the each packet includes a destination designated in the each packet, and in response to the determining that the reached point of the each packet does not include the destination designated in the each packet, outputting a determination result indicating that the each packet does not influence the network before the setting change.

* * * * *